(12) United States Patent
Kanapathipillai et al.

(10) Patent No.: US 10,437,595 B1
(45) Date of Patent: Oct. 8, 2019

(54) LOAD/STORE DEPENDENCY PREDICTOR OPTIMIZATION FOR REPLAYED LOADS

(71) Applicant: Apple Inc., Cupertino, CA (US)

(72) Inventors: Pradeep Kanapathipillai, Santa Clara, CA (US); Stephan G. Meier, Los Altos, CA (US); Gerard R. Williams, III, Los Altos, CA (US); Mridul Agarwal, Sunnyvale, CA (US); Kulin N. Kothari, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 383 days.

(21) Appl. No.: 15/070,435

(22) Filed: Mar. 15, 2016

(51) Int. Cl.
  *G06F 9/38* (2018.01)
  *G06F 9/30* (2018.01)

(52) U.S. Cl.
  CPC ...... *G06F 9/30145* (2013.01); *G06F 9/30021* (2013.01); *G06F 9/3834* (2013.01)

(58) Field of Classification Search
  CPC ..... G06F 9/3834; G06F 9/3836; G06F 9/3838
  See application file for complete search history.

(56) References Cited

U.S. PATENT DOCUMENTS

| | | | |
|---|---|---|---|
| 4,521,851 A | 6/1985 | Trubisky et al. | |
| 4,594,660 A | 6/1986 | Guenthner et al. | |
| 4,860,199 A | 8/1989 | Langendorf et al. | |
| 5,276,825 A | 1/1994 | Blomgren et al. | |
| 5,404,470 A | 4/1995 | Miyake | |
| 5,440,752 A | 8/1995 | Lentz et al. | |
| 5,465,336 A | 11/1995 | Imai et al. | |
| 5,467,473 A | 11/1995 | Kahle et al. | |
| 5,471,598 A | 11/1995 | Quattromani et al. | |
| 5,475,823 A | 12/1995 | Amerson et al. | |
| 5,487,156 A | 1/1996 | Popescu et al. | |

(Continued)

FOREIGN PATENT DOCUMENTS

| | | |
|---|---|---|
| EP | 0651323 A1 | 5/1995 |
| EP | 0651331 A1 | 5/1995 |

(Continued)

OTHER PUBLICATIONS

International Search Report and Written Opinion in application No. PCT/US2013/037809, dated Sep. 10, 2013, 16 pages.

(Continued)

*Primary Examiner* — Jacob Petranek
(74) *Attorney, Agent, or Firm* — Meyertons Hood Kivlin Kowert and Goetzel PC; Rory D. Rankin

(57) ABSTRACT

Systems, apparatuses, and methods for optimizing a load-store dependency predictor (LSDP). When a younger load instruction is issued before an older store instruction and the younger load is dependent on the older store, the LSDP is trained on this ordering violation. A replay/flush indicator is stored in a corresponding entry in the LSDP to indicate whether the ordering violation resulted in a flush or replay. On subsequent executions, a dependency may be enforced for the load-store pair if a confidence counter is above a threshold, with the threshold varying based on the status of the replay/flush indicator. If a given load matches on multiple entries in the LSDP, and if at least one of the entries has a flush indicator, then the given load may be marked as a multimatch case and forced to wait to issue until all older stores have issued.

20 Claims, 11 Drawing Sheets

(56) References Cited

U.S. PATENT DOCUMENTS

| | | | |
|---|---|---|---|
| 5,490,259 A | 2/1996 | Hiraoka et al. | |
| 5,557,763 A | 9/1996 | Senter et al. | |
| 5,606,670 A | 2/1997 | Abramson et al. | |
| 5,619,662 A | 4/1997 | Steely, Jr. et al. | |
| 5,625,789 A | 4/1997 | Hesson et al. | |
| 5,625,835 A | 4/1997 | Ebcioglu et al. | |
| 5,651,125 A | 7/1997 | Witt et al. | |
| 5,652,859 A | 7/1997 | Mulla et al. | |
| 5,666,506 A | 9/1997 | Hesson et al. | |
| 5,710,902 A | 1/1998 | Sheaffer et al. | |
| 5,717,883 A | 2/1998 | Sager | |
| 5,742,791 A | 4/1998 | Mahalingaiah et al. | |
| 5,748,978 A | 5/1998 | Narayan et al. | |
| 5,751,983 A | 5/1998 | Abramson et al. | |
| 5,754,812 A | 5/1998 | Favor et al. | |
| 5,761,712 A | 6/1998 | Tran et al. | |
| 5,768,555 A | 6/1998 | Tran et al. | |
| 5,781,752 A | 7/1998 | Moshovos et al. | |
| 5,781,790 A | 7/1998 | Abramson et al. | |
| 5,799,165 A | 8/1998 | Favor et al. | |
| 5,802,588 A | 9/1998 | Ramagopal et al. | |
| 5,822,559 A | 10/1998 | Narayan et al. | |
| 5,832,297 A | 11/1998 | Ramagopal et al. | |
| 5,835,747 A | 11/1998 | Trull | |
| 5,850,533 A | 12/1998 | Panwar et al. | |
| 5,884,060 A | 3/1999 | Vegesna et al. | |
| 5,884,061 A | 3/1999 | Hesson et al. | |
| 5,887,152 A | 3/1999 | Tran | |
| 5,923,862 A | 7/1999 | Nguyen et al. | |
| 5,996,068 A | 11/1999 | Dwyer, III et al. | |
| 6,016,540 A | 1/2000 | Zaidi et al. | |
| 6,021,485 A | 2/2000 | Feiste et al. | |
| 6,108,770 A | 8/2000 | Chrysos et al. | |
| 6,122,727 A | 9/2000 | Witt | |
| 6,141,747 A | 10/2000 | Witt | |
| 6,212,622 B1 | 4/2001 | Witt | |
| 6,212,623 B1 | 4/2001 | Witt | |
| 6,266,744 B1 | 7/2001 | Hughes et al. | |
| 6,393,536 B1 | 5/2002 | Hughes et al. | |
| 6,481,251 B1 | 11/2002 | Meier et al. | |
| 6,502,185 B1 | 12/2002 | Keller et al. | |
| 6,523,109 B1 | 2/2003 | Meier | |
| 6,542,984 B1 | 4/2003 | Keller et al. | |
| 6,571,318 B1 | 5/2003 | Sander et al. | |
| 6,622,237 B1 | 9/2003 | Keller et al. | |
| 6,625,723 B1 | 9/2003 | Jourday et al. | |
| 6,651,161 B1 | 11/2003 | Keller et al. | |
| 6,658,554 B1 | 12/2003 | Moshovos et al. | |
| 6,658,559 B1 | 12/2003 | Arora et al. | |
| 6,678,807 B2 | 1/2004 | Boatright et al. | |
| 6,694,424 B1 | 2/2004 | Keller et al. | |
| 6,728,867 B1 | 4/2004 | Kling | |
| 6,918,030 B2 | 7/2005 | Johnson | |
| 7,062,617 B2 | 6/2006 | Dundas | |
| 7,181,598 B2 | 2/2007 | Jourdan et al. | |
| 7,376,817 B2* | 5/2008 | Kadambi | G06F 9/30043 |
| | | | 712/220 |
| 7,415,597 B2 | 8/2008 | Filippo et al. | |
| 9,128,725 B2 | 9/2015 | Meier et al. | |
| 2002/0178349 A1 | 11/2002 | Shibayama et al. | |
| 2003/0065909 A1 | 4/2003 | Jourdan | |
| 2003/0126405 A1* | 7/2003 | Sager | G06F 9/3836 |
| | | | 712/200 |
| 2003/0126409 A1 | 7/2003 | Juan et al. | |
| 2003/0217251 A1 | 11/2003 | Jourdan et al. | |
| 2005/0268075 A1 | 12/2005 | Caprioli et al. | |
| 2006/0095734 A1 | 5/2006 | Filippo et al. | |
| 2006/0248281 A1 | 11/2006 | Al-Sukhni et al. | |
| 2007/0226470 A1* | 9/2007 | Krimer | G06F 9/3017 |
| | | | 712/225 |
| 2007/0288726 A1 | 12/2007 | Luick | |
| 2008/0183986 A1 | 7/2008 | Yehia et al. | |
| 2008/0209190 A1 | 8/2008 | Bhargava et al. | |
| 2009/0083263 A1 | 3/2009 | Felch et al. | |
| 2009/0187727 A1 | 7/2009 | Caprioli et al. | |
| 2010/0011198 A1 | 1/2010 | Hooker et al. | |
| 2010/0205384 A1* | 8/2010 | Beaumont-Smith | G06F 12/0862 |
| | | | 711/154 |
| 2010/0228950 A1 | 9/2010 | Henry et al. | |
| 2010/0293347 A1 | 11/2010 | Luttrell | |
| 2010/0306509 A1* | 12/2010 | Day | G06F 9/3834 |
| | | | 712/217 |
| 2010/0325395 A1 | 12/2010 | Burger et al. | |
| 2011/0138149 A1 | 6/2011 | Karlsson et al. | |
| 2011/0143811 A1 | 6/2011 | Rodriguez | |
| 2011/0153986 A1 | 6/2011 | Alexander et al. | |
| 2013/0298127 A1* | 11/2013 | Meier | G06F 9/3834 |
| | | | 718/100 |
| 2013/0326198 A1* | 12/2013 | Meier | G06F 9/3834 |
| | | | 712/216 |
| 2014/0281408 A1* | 9/2014 | Zeng | G06F 9/30043 |
| | | | 712/216 |
| 2014/0337581 A1* | 11/2014 | Meier | G06F 9/3836 |
| | | | 711/123 |
| 2015/0309792 A1* | 10/2015 | Meier | G06F 9/30043 |
| | | | 712/225 |

FOREIGN PATENT DOCUMENTS

| | | |
|---|---|---|
| EP | 0709770 A2 | 5/1996 |
| EP | 0727737 A2 | 8/1996 |
| GB | 2281442 A | 3/1995 |
| TW | 200841238 A | 10/2008 |
| TW | 201003516 A | 1/2010 |
| TW | 201033898 A | 9/2010 |
| WO | 96/12227 A1 | 4/1996 |
| WO | 97/27538 A1 | 7/1997 |
| WO | 01/050252 A1 | 7/2001 |
| WO | 2006/028555 A2 | 3/2006 |

OTHER PUBLICATIONS

Extended Search Report in European Application No. 13165284.4, dated Sep. 30, 2013, 9 pages.

Communication pursuant to Article 94(3) EPC in European Application No. 13165284.4, dated Jul. 23, 2014, 6 pages.

Notice of Preliminary Rejection in Korean Patent Application No. 10-2013-49975, dated Jul. 23, 2014, 11 pages.

Jaleel et al., "Using Virtual Load/Store Queues (VLSQs) to Reduce the Negative Effects of Reordered Memory Instructions", In the Proceedings of the 11th International Symposium on High-Performance Computer Architecture, Feb. 2005, 10 pages, IEEE Computer Society, Washington, DC, USA.

Leibholz, et al., "The Alpha 21264: A 500 MHz Out-of Order Execution Microprocessor", Feb. 1997, IEEE, pp. 28-36, IEEE Computer Society Press, Los Alamitos, CA, USA.

Popescu et al., "The Metaflow Architecture", IEEE Micro, Jun. 1991, pp. 10-13 and 63-73, IEEE Computer Society Press, Los Alamitos, CA, USA.

Moshovos et al., "Speculative Memory Cloaking and Bypassing", International Journal of Parallel Programming, Dec. 1999, 15 pages, Kluwer Academic Publishers, Norwell, MA, USA.

Moshovos et al., "Streamlining Inter-operation Memory Communication via Data Dependence Prediction", In Proceedings of the 30th International Symposium on Microarchitecture, Dec. 1997, 11 pages, IEEE Computer Society, Washington, DC, USA.

Gopal et al., "Speculative Versioning Cache", In Proceedings of the 4th International Symposium on High-Performance Computer Architecture, Jan. 1998, 11 pages, IEEE Computer Society, Washington, DC, USA.

Chrysos et al., "Memory Dependence Prediction Using Store Sets", Proceedings of the 25th Annual International Symposium on Computer Architecture, Apr. 16, 1998, 12 pages, IEEE Computer Society, Washington, DC, USA.

Moshovos et al., "Dynamic Speculation and Synchronization of Data Dependences", Proceedings of the 24th Annual International Symposium on Computer Architecture, Jun. 1, 1997, 13 pages, ACM, New York, NY, USA.

(56) References Cited

OTHER PUBLICATIONS

Johnson, Mike, "Chapter 7: Out-of-Order Issue", Superscalar Microprocessor Design, 1991, pp. 127-129, Prentice-Hall, Inc., Englewood Cliffs, NJ, USA.
Gwennap, Linley, "Digital 21264 Sets New Standard: Clock Speed, Complexity, Performance Surpass Records, But Still a Year Away", Microdesign Resources, Oct. 28, 1996, 6 pages, vol. 10, No. 14.
Reinman et al. "Predictive Techniques for Aggressive Load Speculation", In the Proceedings of the Annual 31st International Symposium on Microarchitecture, Dec. 1998, pp. 127-137, IEEE Computer Society Press, Los Alamitos, CA, USA.
Office Action in Japanese Patent Application No. 2013-096795, dated Aug. 18, 2014, 27 pages.
Office Action in Taiwan Patent Application No. 102115961, dated Nov. 20, 2014, 23 pages.
International Search Report and Written Opinion in application No. PCT/US2013/041852 dated Sep. 30, 2013 pp. 1-14.
Jamil, Tariq, "RAM versus CAM", IEEE Potentials, Apr. 1997, pp. 26-29, http://ieeexplore.ieee.org/stamp/stamp.isp?tp=&arnumber=580445. [Retrieved on Feb. 5, 2015].
Jacob, Bruce, "The RiSC-16 Instruction-Set Architecture", 2000, 4 pages, http://www.eng.umd.edu/~blj/RiSC/RiSC-isa.pdf. [Retrieved on Jan. 30, 2015].
"Dynamic Scheduling", Jul. 13, 2010, 11 pages, http://www.ece.unm.edu/~jimp/611/slides/chap4_4.html. [Retrieved on Jan. 30, 2015].
"ARM® Compiler toolchain: Using the Assembler", ARM, 2011, 4 pages, version 4.1, http://infocenter.arm.com/help/index.jsp?topic=/com.arm.doc.dui0473c/CEGCCADE.html. [Retrieved on Jan. 30, 2015].
Non-Final Office Action in U.S. Appl. No. 13/483,268, dated Feb. 23, 2015, 28 pages.
Kubiatowicz, John, "Reorder Buffers and Explicit Register Renaming", Sep. 22, 2000, 55 pages, http://www.cs.berkeley.edu/~kubitron/courses/cs252-F00/lectures/lec07-renamereorder.ppt. [Retrieved on Feb. 5, 2015].
Notice of Last Preliminary Rejection in Korean Patent Application No. 10-2013-49975, dated Feb. 9, 2015, 4 pages.
Office Action in Taiwan Patent Application No. 102119009, dated Feb. 13, 2015, 6 pages.
Final Office Action in Japanese Patent Application No. 2013-096795, dated Mar. 4, 2015, 19 pages.
Final Office Action in U.S. Appl. No. 13/483,268, dated Jun. 15, 2015, 12 pages.
Notification of the First Office Action in Chinese Application No. 201310323392.0, dated May 4, 2015, 33 pages.

* cited by examiner

LOAD/STORE DEPENDENCY PREDICTOR OPTIMIZATION FOR REPLAYED LOADS

BACKGROUND

Technical Field

Embodiments described herein relate to the field of processors and more particularly, to handling load-store dependencies in a processor.

Description of the Related Art

A processor generally includes hardware circuitry designed to execute program instructions defined in a particular instruction set architecture. A sequence of instructions as defined in the instruction set architecture can be provided to the processor to implement desired functionality in a system that includes the processor. Processors generally include support for load memory operations and store memory operations to facilitate transfer of data between the processors and memory to which the processors are coupled. Generally speaking, a load memory operation is an operation specifying a transfer of data from a memory location to the processor. A store memory operation is an operation specifying a transfer of data from the processor to memory. Load and store memory operations may be an implicit part of an instruction which includes a memory operation, or may be explicit instructions, in various implementations. Load and store memory operations are more succinctly referred to herein as loads and stores, respectively.

A given load/store may specify the transfer of one or more bytes beginning at a memory address calculated during execution of the load/store. This memory address is referred to as the data address of the load/store. The load/store itself (or the instruction from which the load/store is derived) is located by an instruction address used to fetch the instruction, commonly referred to as the program counter address (or PC). The data address is typically calculated by adding one or more address operands specified by the load/store to generate an effective address or virtual address, which may optionally be translated through an address translation mechanism to a physical address of a memory location within the memory.

Processors may attempt to achieve high performance by issuing and executing multiple instructions per clock cycle and by employing the highest possible clock frequency consistent with the design. One way to increase the number of instructions executed per clock cycle is by performing out-of-order execution. In out-of-order execution, instructions may be executed in an order other than that specified in the program sequence (or "program order"). Modern out-of-order processors are often configured to execute loads and stores out-of-order, and also permit loads to access memory in a speculative manner.

Some processors may be as aggressive as possible in scheduling instructions out-of-order and/or speculatively in an attempt to maximize the performance gain realized. For example, it may be desirable to schedule loads prior to older stores, since loads more typically have dependent instructions. However, in some cases, a load may depend on an older store (e.g., the store updates at least one byte accessed by the load). In such cases, the load is incorrectly executed if executed prior to the store. If a load is executed prior to a dependent older store, the processor may need to be flushed and redirected, which will degrade processor performance.

SUMMARY

Systems, apparatuses, and methods for optimizing a load-store dependency predictor for replayed loads.

In one embodiment, a processor includes at least an issue unit, a load-store dependency predictor (LSDP), one or more reservation stations, and one or more execution units. The execution units may include a load store unit having a store queue that stores speculatively executed store instructions. The LSDP may include a table for storing entries of load-store pairs that caused a load-store order violation when a younger load that was dependent on an older store issued before the older store.

When a load is flushed or replayed as a result of issuing out of order with respect to an older store on which the load is dependent, an entry may be created in the LSDP for the load-store pair. The flush/replay status of the load may be stored in an indicator in the entry to indicate whether the load was flushed or replayed. Each entry of the LSDP table may also include a confidence counter to indicate the strength of the prediction of the dependency. When a lookup of a load matches on an entry of the LSDP, the entry's confidence counter may be compared to a threshold, with the threshold varying based on whether the entry indicates a prior flush or replay.

In one embodiment, a store instruction may be split into a store address operation and a store data operation to be issued separately. A younger load may be dependent on an older store, and the younger load may issue after the older store's address operation but before the older store's data operation. In this case, the dependency between the younger load and the older store address operation may be detected prior to the younger load accessing stale data, and the younger load may be replayed rather than flushed. An entry may be allocated for this load-store pair in the LSDP, and the entry may be identified as a replay case. If the younger load issues before both of the store address and store data operations, then the younger load may retrieve stale data and have to be flushed. In this case, the entry in the LSDP may identify this load-store pair as a flush case.

When a load is identified in the instruction stream, a lookup may be performed of the LSDP for the load. If the lookup results in a hit, then the flush/replay indicator and the confidence counter may be retrieved from the matching entry. The confidence counter may be compared to one or more thresholds to determine how to schedule the load with respect to the store of the load-store pair. In one embodiment, if the entry is for a flush, then the confidence counter may be compared to a first threshold. If the confidence counter is greater than the first threshold, then the load may wait to issue until after the store. Otherwise, if the confidence counter is less than the first threshold, the load may issue when ready regardless of when the store issues. If the entry is for a replay, then the confidence counter may be compared to a second threshold which may be different from the first threshold. In one embodiment, the second threshold may be greater than the first threshold. When the entry is marked as a replay case, if the confidence counter is above the second threshold, then the load may wait to issue until after the store. Otherwise, if the confidence counter is less than the second threshold, the load may issue when ready regardless of when the store issues.

If the lookup of the load results in multiple hits to multiple entries of the LSDP, then the LSDP may determine the flush/replay status of each of the multiple matching entries. If at least one of the matching entries is marked as a flush, then the load may wait to issue until all older stores in the LSDP have issued. Otherwise, if all of the matching entries are marked as replays, then in one embodiment, the load may issue when ready. In another embodiment, if all of the matching entries are marked as replays, the LSDP may select one of these entries and treat the load as if it were a match to only this single entry. The LSDP may then determine when to issue the load based on a comparison of the selected entry's confidence counter to the second threshold.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
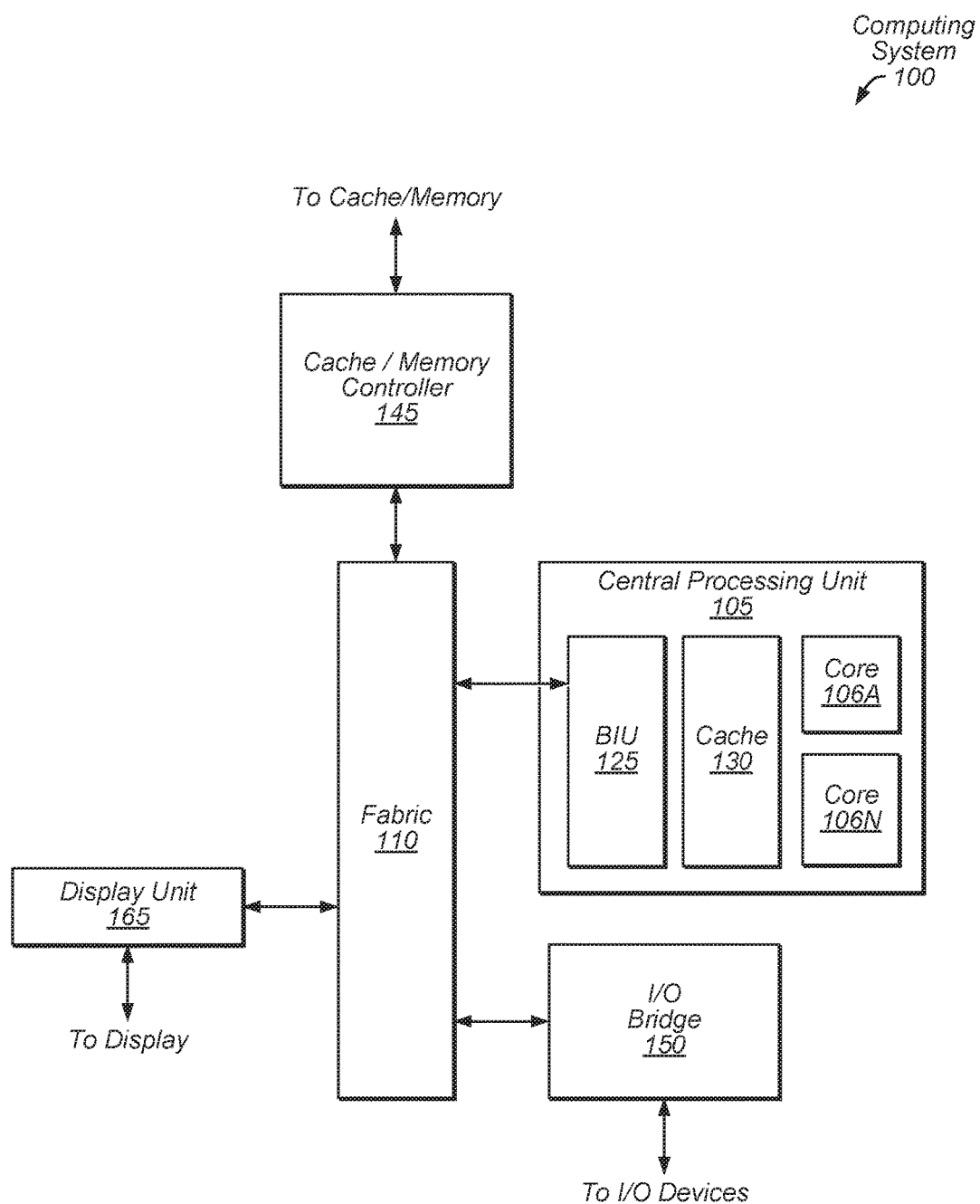
FIG. 1 is a block diagram illustrating one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor . . . ." Such a claim does not foreclose the system from including additional components (e.g., a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a computing system 100. In some embodiments, some or all elements of the computing system 100 may be included within a system on a chip (SoC). In some embodiments, computing system 100 may be included in a mobile device. In the illustrated embodiment, the computing system 100 includes fabric 110, central processing unit (CPU) 105, input/output (I/O) bridge 150, cache/memory controller 145, and display unit 165. Although the computing system 100 illustrates central processing unit 105 as being connected to fabric 110 as a sole central processing unit of the computing system 100, in other embodiments, central processing unit 105 may be connected to or included in other components of the computing system 100. Additionally or alternatively, the computing system 100 may include multiple central processing units 105. The multiple central processing units 105 may include different units or equivalent units, depending on the embodiment.

Fabric 110 may include various interconnects, buses, MUXes, controllers, etc., and may be configured to facilitate communication between various elements of computing system 100. In some embodiments, portions of fabric 110 may be configured to implement various different communication protocols. In other embodiments, fabric 110 may implement a single communication protocol and elements coupled to fabric 110 may convert from the single communication protocol to other communication protocols internally.

In the illustrated embodiment, central processing unit 105 includes bus interface unit (BIU) 125, cache 130, and cores 106A and 106N. In various embodiments, central processing unit 105 may include various numbers of cores and/or caches. For example, central processing unit 105 may include 1, 2, or 4 processor cores, or any other suitable number. In some embodiments, cores 106A and/or 106N may include internal instruction and/or data caches. In some embodiments, a coherency unit (not shown) in fabric 110, cache 130, or elsewhere in computing system 100 may be configured to maintain coherency between various caches of computing system 100. BIU 125 may be configured to manage communication between central processing unit 105 and other elements of computing system 100. Processor cores such as cores 106A and 106N may be configured to execute instructions of a particular instruction set architecture (ISA), which may include operating system instructions and user application instructions.

Cache/memory controller 145 may be configured to manage transfer of data between fabric 110 and one or more caches and/or memories (e.g., non-transitory computer readable mediums). For example, cache/memory controller 145 may be coupled to an L3 cache, which may, in turn, be coupled to a system memory. In other embodiments, cache/memory controller 145 may be directly coupled to a memory. In some embodiments, the cache/memory controller 145 may include one or more internal caches.

Display unit 165 may be configured to read data from a frame buffer and provide a stream of pixel values for display. Display unit 165 may be configured as a display pipeline in some embodiments. Furthermore, display unit 165 may include one or more interfaces (e.g., MIPI® or embedded display port (eDP)) for coupling to a user display (e.g., a touchscreen or an external display). I/O bridge 150 may include various elements configured to implement universal serial bus (USB) communications, security, audio, low-power always-on functionality, and/or other functions. I/O bridge 150 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 100 via I/O bridge 150. In some embodiments, central processing unit 105 may be coupled to computing system 100 via I/O bridge 150.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
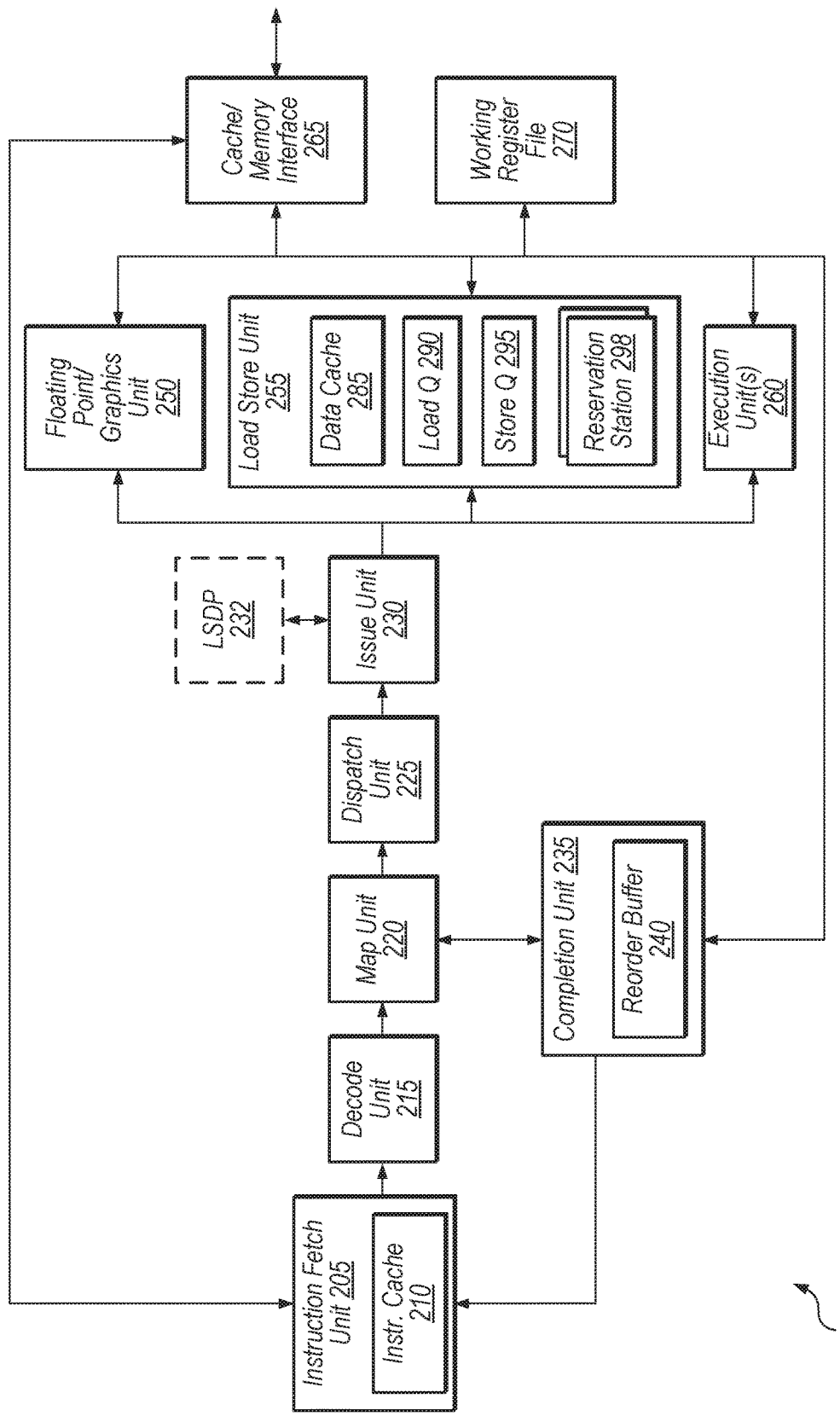
FIG. 2 is a block diagram illustrating one embodiment of a processor.

Turning now to FIG. 2, a block diagram of one embodiment of a processor 200 is shown. In various embodiments, the logic of processor 200 may be included in one or more of cores 106A-N of CPU 105 (of FIG. 1). Processor 200 includes instruction fetch unit (IFU) 205 which includes an instruction cache 210. IFU 205 is coupled to various processing components that embody an instruction processing pipeline that begins with a decode unit 215 and proceeds in turn through map unit 220, dispatch unit 225, and issue unit 230. The issue unit 230 is coupled to load-store dependency predictor (LSDP) 232. The issue unit 230 is also coupled to instruction execution resources including the execution unit(s) 260, the load/store unit (LSU) 255, and the floating-point/graphics unit (FGU) 250. These instruction execution resources are also coupled to the working register file 270. Additionally, LSU 255 is coupled to cache/memory interface 265. Completion unit 235 is coupled to IFU 205, map unit 220, working register file 270, and the outputs of any number of the instruction execution resources. It is noted that the components shown in FIG. 2 are only one implementation of a processor. It is contemplated that in other embodiments, some components may be omitted and other components may be added. Thus, alternative configurations and variations are possible and contemplated.

The IFU 205 may be configured to provide instructions to the rest of the pipeline components for execution. In one embodiment, the IFU 205 may be configured to fetch instructions from an instruction cache 210 and to buffer those instructions for downstream processing, request data from a cache or memory through the cache/memory interface 265 in response to instruction cache misses, and predict the direction and target of control transfer instructions (e.g., branches).

It is noted that the concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load/store unit). The latter meaning may also be referred to as "performing" the instruction. Thus, "performing" a store instruction refers to retrieving the value of the store's target location, which may, in some embodiments, be accomplished by a circuit at an execute stage of a pipeline (e.g., by a load/store unit). Conversely, "executing" the store instruction may refer to the entirety of operations that occur throughout the pipeline as a result of the store instruction. Instructions may be speculatively executed, and may be flushed and replayed or retried if one or more conditions are not as speculated. In addition, the speculatively executed instructions may be held while waiting for the conditions to be fulfilled. Various approaches to flushing and replaying instructions are known in the art. Generally speaking, as used herein the terms "flush" or "flushing" refer to removing one or more instructions from execution in a processor pipeline. If the removed instructions are to be subsequently executed, they will typically need to be refetched. On the other hand, as used herein the terms "replay", "retry", "retrying" or "replaying" refer to re-executing an instruction without the instruction being refetched. For example, replay of an instruction may entail redirecting the instruction to an earlier stage of a pipeline. Flushing and replaying may both involve undoing ("rewinding") changes that have been made to a state of the processor in order to return to an earlier state. As such, rewinding may refer to undoing operations performed during execution of one or more instructions. For example, rewinding may include un-mapping physical registers and destination registers, marking results as invalid, removing entries from various buffers, and so on.

Further, as used herein, the term "target" in the context of load and store instructions refers to the location from which a load instruction should read or the location to which a store instruction should write. A target may be identified by a virtual address and/or a physical address. In some situations, instructions with the same target may not actually access the same storage element. For example, an older store may write information to a target location in a memory (or a cache) while a load reads from the target by forwarding the data from the store without accessing a cache or memory. In this example situation the load and the store both target the same target location (e.g., using the same memory address), but do not use the same storage element to access the target location. Further, an instruction may "target" a cache line when it targets a location in the cache line. Also, snoops typically target a cache on a cache-line basis.

In one embodiment, the decode unit 215 may be configured to prepare fetched instructions for further processing. The decode unit 215 may be configured to identify the particular nature of an instruction (e.g., as specified by its opcode) and to determine the source and destination registers encoded in an instruction, if any. In some embodiments, the decode unit 215 may be configured to detect certain dependencies among instructions and/or to convert certain complex instructions to two or more simpler instructions for execution.

As used herein, the term "instruction" refers to information indicative of one or more operations to be performed by a processor pipeline. An "operation" may include a processing element doing nothing during a given processing cycle, e.g., based on a "nop" or "no-operation" instruction or a conditional instruction for which the condition is false. An instruction may be defined by a given instruction set architecture (ISA). An instruction may also be defined by a microarchitecture rather than tied to a particular ISA. For example, the decode unit 215 may be configured to decode an ISA instruction into one or more micro-operations, which may also be referred to as "instructions" when they specify an operation to be performed by a processor pipeline. Thus, a "store instruction" may or may not be defined by an ISA. A store instruction includes information indicative that a store operation is to be performed and typically includes information indicating a store's target memory location.

As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Register renaming may facilitate the elimination of certain dependencies between instructions (e.g., write-after-read or "false" dependencies), which may in turn prevent unnecessary serialization of instruction execution. In one embodiment, map unit 220 may be configured to rename the architectural destination registers specified by instructions of a particular ISA by mapping them to a physical register space, resolving false dependencies in the process.

Once decoded and renamed, instructions may be ready to be scheduled for performance. In the illustrated embodiment, the dispatch unit 225 may be configured to schedule (i.e., dispatch) instructions that are ready for performance and to send the instructions to issue unit 230. In one embodiment, the dispatch unit 225 may be configured to maintain a schedule queue that stores a number of decoded and renamed instructions as well as information about the relative age and status of the stored instructions. For example, taking instruction dependency and age information into account, dispatch unit 225 may be configured to pick one or more instructions to send to issue unit 230.

Issue unit 230 may be coupled to LSDP 232 which may be configured to train on and predict dependent load-store instruction pairs that are likely to issue out-of-order. Depending on the embodiment, LSDP 232 may be located within map unit 220, dispatch unit 225, or issue unit 230, or LSDP 232 may be located separately from these other units.

When an ordering violation is detected between a younger load and older store with overlapping addresses, LSDP 232 may be trained on the load-store pair that caused the ordering violation. LSDP 232 may include a table with entries for the load-store pairs that have been detected, and each entry may include information identifying the load and store instructions, whether the load-store pair caused a flush or replay, and a confidence counter indicative of the strength of the prediction. The table may be a content-addressable memory (CAM) for one or more fields of the table.

Various corrective actions may be taken as a result of an ordering violation caused by the execution of a younger load before an older store with overlapping physical addresses so as to prevent a repeat of the ordering violation. A first type of training may be performed if the ordering violation resulted in a flush of the younger load, while a second type of training may be performed if the ordering violation resulted in a replay of the younger load without the younger load being flushed. The second type of training may be different from the first type of training.

An entry may be allocated in the table of LSDP 232 the first time a load-store pair causes an ordering violation. Each entry of the table in LSDP 232 may include a confidence counter to indicate the strength of the dependency prediction. In one embodiment, for the first type of training, when the younger load is flushed, the confidence counter of the corresponding entry may be incremented by a first value. For the second type of training, when the younger load is replayed and not flushed, the confidence counter may be incremented by a second value, wherein the second value is less than the first value.

When a load is detected in the instruction sequence, a search of LSDP 232 may be performed for the load. Assuming the load matches on a single entry, if the confidence counter from the matching entry is above a threshold, then the dependency may be enforced for the load-store pair. Enforcing the dependency involves waiting for the corresponding store to issue before issuing the load. If the confidence counter from the matching entry is below the threshold, then the dependency may not be enforced for the load-store pair. Not enforcing the dependency involves allowing the load to issue before the store, or at least not forcing the load to wait for the store. In another embodiment, different thresholds may be utilized for comparison against the confidence counter depending on whether the load-store pair is identified as a flush scenario or a replay scenario.

When the load-store pair is encountered after the initial detection of the ordering violation and after an entry is allocated for the load-store pair in the table of LSDP 232, the entry may be trained depending on how the load receives its data. If the load receives its data from the store queue 295, then the confidence counter in the corresponding entry may be incremented. Otherwise, if the load receives its data from the data cache 285, then the confidence counter in the corresponding entry may be decremented.

In another embodiment, each entry of the table in LSDP 232 may include a confidence counter and a replay/flush indicator. When a load is encountered in the instruction stream and the load matches on a single entry of the table in LSDP 232, then if the entry has a flush indicator and the confidence counter is above a first threshold, then the dependency may be enforced for the load-store pair. Otherwise, if the entry has a replay indicator, then the dependency may be enforced for the load-store pair only if the confidence counter is above a second threshold. In one embodiment, the second threshold may be greater than the first threshold. In this embodiment, a first load-store entry corresponding to a flush event may have a lower threshold for enforcing the load-store dependency than a second load-store entry corresponding to a replay event. A flush event may be more detrimental to the performance of processor 200 as compared to a replay event, and so the processor 200 may implement a stricter mechanism to avoid a flush event.

In some embodiments, replay events may be encountered more often than flush events. In these embodiments, processor 200 and LSDP 232 may be optimized for processing replay events. For example, in one embodiment, the threshold for a replay event may be two. In this embodiment, the first time a replay event is detected for a given load-store pair, the confidence counter for the given load-store pair may be incremented to one, which is less than the threshold. Then, the next time the load-store pair is encountered, LSDP 232 may not cause the load to wait for the store to issue. This may result in another replay event occurring. However, if another replay event occurs for the same load-store pair, then the confidence counter will be incremented to two, which is equal to the threshold, and then the load will wait for the store to issue on the next (or third) execution of the load-store pair.

There may be cases when a given load-store pair causes a replay event once but then after the first replay event, the dependency may no longer exist for the given load-store pair. For these cases, waiting to establish a dependency (i.e., make the load wait for the store to issue) for the given load-store pair until at least two or more replay events have occurred prevents a false dependency from being established which will degrade processor performance. In other cases, if a replay event occurs once for a given load-store pair, the replay event will reoccur on subsequent executions of the given load-store pair. For these cases, once the confidence counter for the given load-store pair is equal to (or greater than, depending on the embodiment) the replay event threshold, then the load may be required to wait for the store to issue. With this approach, there may be a penalty of a replay event occurring twice for some load-store pairs, but this approach cuts down on the inefficiency of forcing the load to wait for the store in cases when the load is no longer dependent on the store after the initial replay event. Accordingly, fewer false dependencies will be established for load-store pairs which cause an initial replay event. It is noted that in other embodiments, a similar approach may be utilized for flush events.

It is noted that the replay/flush indicator may change for a given entry if the most recent execution of the load caused a replay or flush and the indicator is set to the opposite field. In other words, the replay/flush indicator may be set based on whether the most recent ordering violation for the load-store pair resulted in a replay or flush. Accordingly, the replay/flush indicator may change over time as the result of the load-store pair's ordering violation alternates between causing a replay and causing a flush.

If a load matches on multiple entries of the table of LSDP 232, then the LSDP 232 may determine the status of the replay/flush indicators of the multiple matching entries. If any of the matching entries has a flush indicator, then LSDP 232 may treat the load as a multimatch case and convey an indication of multimatch to the corresponding reservation station 298. The load may then wait for all older stores in the pipeline to issue before the load is issued. In one embodiment, if all of the matching entries have replay indicators, then LSDP 232 may treat the load as if it matched on a single entry even though the load actually matched on multiple entries. Accordingly, in this embodiment, when all of the matching entries have replay indicators, LSDP 232 may convey an indication that the load is not a multimatch case, and then the load may be allowed to issue before all of the older stores have issued. In another embodiment, if all of the matching entries have replay indicators, then LSDP 232 may treat the load as if it did not match on any entries.

The issue unit 230 may be configured to provide instruction sources and data to the various execution units for picked (i.e., scheduled or dispatched) instructions. In one embodiment, the issue unit 230 may include reservation stations for storing instructions while waiting for their operands and/or for other processing resources to become available. In other embodiments, the issue unit 230 may provide instructions to reservation stations (e.g., reservation stations 298) distributed among FGU 250, LSU 255, execution unit(s) 260, etc. Results may also be sourced from register files representing architectural (i.e., user-visible) as well as non-architectural state. In the illustrated embodiment, processor 200 includes a working register file 270 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units to be performed. In one embodiment, each of execution unit(s) 260 may be similarly or identically configured to perform certain integer-type instructions defined in the implemented ISA, such as arithmetic, logical, and shift instructions. In some embodiments, architectural and non-architectural register files are physically implemented within or near execution unit(s) 260. It is contemplated that in some embodiments, processor 200 may include any number of integer execution units.

The LSU 255 may be configured to receive instruction information from the instruction processing pipeline (of which LSU 255 may be considered a part) and is coupled to a higher-level cache (relative to data cache 285) and/or a memory. Further, LSU 255 may be configured to process data memory references, such as integer and floating-point load and store instructions and other types of memory reference instructions. In the illustrated embodiment, the LSU 255 includes data cache 285, load queue 290, store queue 295, and reservation stations 298. The LSU 255 may be configured to detect misses in the data cache 285 (which may be a level 1 data cache for example) and to responsively request data from a cache or memory through cache/memory interface 265.

In some embodiments, load queue 290 and store queue 295 are configured to queue load and store instructions, respectively, until their results can be committed to the architectural state of the processor. Instructions in the queues may be speculatively performed, non-speculatively performed, or waiting to be performed. Each queue may include a plurality of entries, which may store loads/stores in program order. However, load and store instructions may be executed out of program order earlier in the processing pipeline. As used herein, the term "queue" refers to a storage element having a plurality of entries. Queues are often used to store data (e.g., data associated with instructions) while waiting for processing resources to become available or for particular events to occur. In some embodiments, queues are used to store instruction information in program order even though the instructions may be performed out of program order. Thus, queues do not always behave in a first-in-first-out (FIFO) manner. For example, if instruction information arrives out of program order but is removed in program order, the information may not be dequeued (or retired) in the same order in which it is enqueued. As used herein, the term "storage element" refers to any element configured to store one or more values in a volatile or non-volatile manner. Examples of storage elements include: registers, memories, latches, disks, etc.

In one embodiment, the load queue 290 may be configured to store information associated with load instructions. More particularly, each entry in load queue 290 may include address information corresponding to the target location of a load, data associated with the load, and status information such as whether or not a store operation to the same target address has been received, for example. Similarly, store queue 295 may be configured to store information associated with store instructions. More particularly, each entry in store queue 295 may include address information corresponding to the target location of a store, data associated with the store, and status information. In other embodiments, the load and store queues may be combined into a single load/store queue.

In one embodiment, the LSU 255 may attempt to speculatively perform loads as soon as they arrive. However, the LSU 255 may retry speculatively-executed loads based on older conflicting stores and cache line migrations, for example. In some embodiments, LSU 255 may not speculatively execute loads when particular conditions persist when the loads arrive at LSU 255. Such loads may reside in load queue 290 while waiting to be performed.

As used herein, the term "conflict" refers to a situation in which memory access instructions target the same memory location in a particular order. For example, if a first load and a first store target the same location with the first store being earlier in program order than the first load, and the first load arrives at LSU 255 before the first store, the first load may be described as conflicting with the first store. In one embodiment LSU 255 would speculatively perform the first load and then replay the first load when the first store arrives. In another embodiment, LSU 255 would wait to perform the first load until the first store arrives. This situation may be referred to as a "read after write" hazard. Other types of conflicts/hazards include "write after read" and "write after write."

In various embodiments, LSU 255 may implement a variety of structures configured to facilitate memory operations. For example, LSU 255 may implement a data translation lookaside buffer (TLB) to cache virtual data address translations. LSU 255 may also include hardware configured to support atomic load-store instructions, memory-related exception detection, read and write access to special-purpose registers (e.g., control registers), and detect memory ordering violations responsive to snoop operations, for example.

Floating-point/graphics unit (FGU) 250 may be configured to perform and provide results for certain floating-point and graphics-oriented instructions defined in the implemented ISA. For example, in one embodiment FGU 250 implements single- and double-precision floating-point arithmetic instructions compliant with the IEEE floating-point standards, such as add, subtract, multiply, divide, and certain transcendental functions.

In the illustrated embodiment, completion unit 235 includes a reorder buffer (ROB) 240. The completion unit may be configured to coordinate transfer of speculative results into the architectural state of processor 200. Entries in ROB 240 may be allocated in program order. The completion unit 235 may include other elements for handling completion/retirement of instructions and/or storing history including register values, etc. As used herein, the terms "complete" and "completion" in the context of an instruction refer to commitment of the instruction's result(s) to the architectural state of a processor or processing element. For example, in one embodiment, completion of an add instruction includes writing the result of the add instruction to a destination register. Similarly, completion of a load instruction includes writing a value (e.g., a value retrieved from a cache or memory) to a destination register or a representation thereof.

In some embodiments, speculative results of instructions may be stored in ROB 240 before being committed to the architectural state of processor 200, and confirmed results may be committed in program order. Entries in ROB 240 may be marked as ready to complete (or "retire") when their results are allowed to be written to the architectural state. The completion unit 235 may also be configured to coordinate instruction flushing and/or replaying of instructions. In order to detect conflicts, each entry in load queue 290 and store queue 295 may include an address of its target location. At least a portion of the address field may be implemented using content addressable memory (CAM). Thus, LSU 255 may provide a load's target address to the CAM fields of older stores in store queue 295 to determine whether any older stores to the same location reside in store queue 295. In some situations, a younger load may arrive at load queue 290 when older stores have not yet arrived at store queue 295. In this situation, in some embodiments, LSU 255 may speculatively execute the younger load but may not allow it to retire until all older stores have reached store queue 295 so that the younger load can be checked for dependencies.

Memory ordering is a common memory system requirement. For example, loads to the same memory address must be ordered with respect to each other, such that a younger load instruction never reads an "older" value of data from a given memory address when an older load to the same address reads a "newer" value. Likewise load-store operations must be ordered to enforce read after write rules to prevent a younger read to a target address from speculatively executing before an older write to the target address has occurred.

As used herein, the terms "older" and "younger" refer to relative ages of instructions in an instruction stream. Said another way, older instructions precede younger instructions in program order. Further, "older" data refers to data associated with a relatively older instruction while "newer" data refers to data associated with a relatively younger instruction. For example, an older store may be described as having written old data to a particular location when a younger store writes new data to the particular location.

Figure 3:
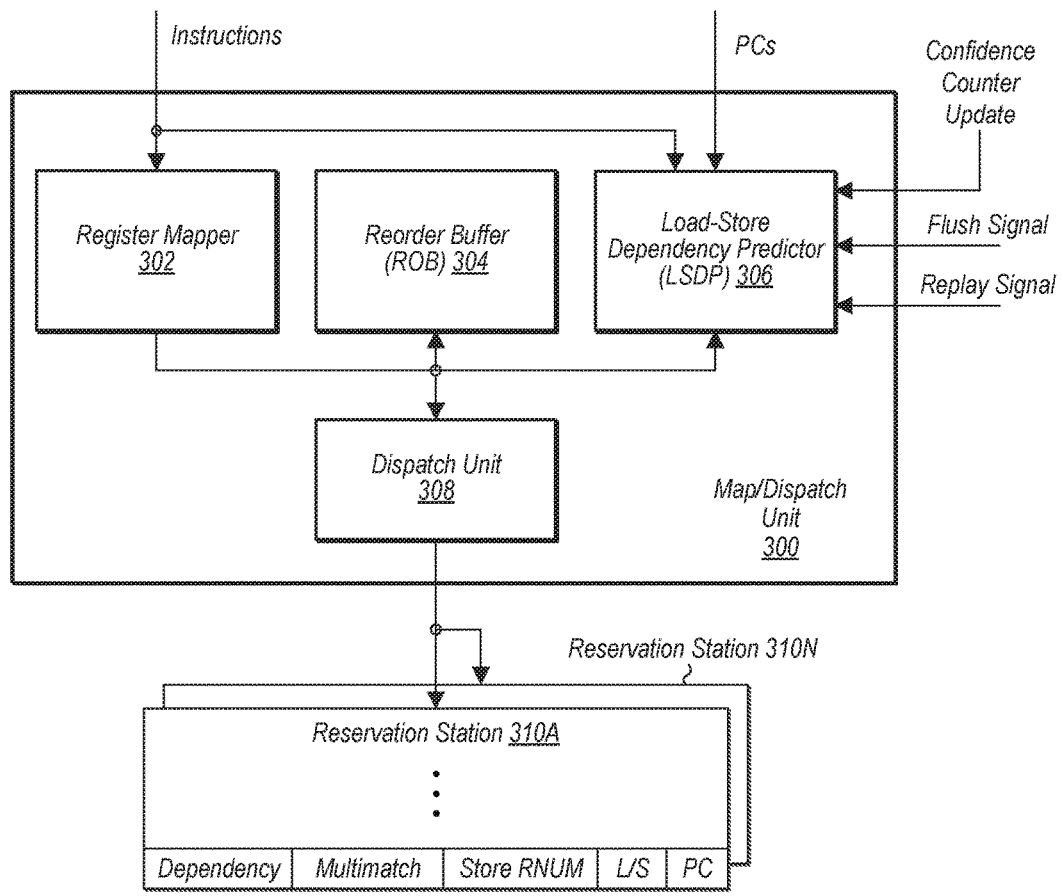
FIG. 3 is a block diagram of one embodiment of a map/dispatch unit and reservation stations.

Referring now to FIG. 3, a block diagram of one embodiment of a map/dispatch unit 300 and reservation stations 310A-N are shown. In one embodiment, map/dispatch unit 300 may include a register mapper 302, a reorder buffer (ROB) 304, a load store dependency predictor (LSDP) 306, and a dispatch unit 308. The register mapper 302 and LSDP 306 are coupled to receive instructions from a decode unit (not shown). LSDP 306 is coupled to receive PCs from the decode unit and is coupled to receive the "Confidence Counter Update", "Flush Signal", and "Replay Signal" indications from a load-store unit (e.g., load-store unit 255 of FIG. 2). Register mapper 302 may be configured to map architectural registers to physical registers, and to provide instructions and physical register addresses to dispatch unit 308. Dispatch unit 308 may be configured to dispatch instructions to reservation stations 310A-N.

LSDP 306 may be configured to check for stores and loads in the instructions, and may compare the PCs of any detected stores and loads to the PCs of stores and loads that previously caused ordering violations and have been allocated entries in the training table. If a PC matches for a given store, LSDP 306 may be configured to arm the corresponding entry in the training table. In one embodiment, LSDP 306 may check the confidence counter indicator before arming the entry. If the indicator is above a threshold then the entry may be armed, and otherwise, if the indicator is below the threshold, then the entry may not be armed. Additionally, LSDP 306 may be configured to capture the ROB index (RNUM) assigned to the store as an identifier of the store.

When a load is detected that matches to the armed entry and the confidence counter indicator for the armed entry is above a given threshold, LSDP 306 may be configured to use the store identifier to generate a dependency for the load on the store, preventing the load from being issued by reservation station 310 until after the store is issued. In one embodiment, LSDP 306 may be configured to forward the store RNUM to a given reservation station 310 along with an indicator that the load has a dependency. Additionally, if there are multiple matches for the load, then LSDP 306 may forward a multimatch indicator to the given reservation station 310. In other embodiments, LSDP 306 may be configured to forward multiple store RNUMs in the multimatch case to reservation station 310, and reservation station 310 may be configured to store more than one store RNUM per load. Other embodiments may indicate the store dependencies in other fashions.

Reservation stations 310A-N are representative of any number of reservation stations which may be utilized as part of a load/store unit (not shown) and/or execution units (not shown). Each reservation station 310A-N may be configured to store operations until the operations are executed by a corresponding functional unit. An example of an entry within reservation station 310A in accordance with one embodiment is shown in FIG. 3. Each of reservation stations 310A-N may include various numbers of entries, depending on the embodiment. Each entry may include a dependency indicator, a multimatch indicator, a store RNUM of a dependency, a load/store (L/S) indicator to indicate if the operation is a load or store, and a PC of an operation. In other embodiments, the entry may include other fields (e.g., source register, destination register, source operands) and/or omit one or more of the fields shown in FIG. 3. Furthermore, other types of entries (e.g., integer, floating point) may be formatted differently.

LSDP 306 may be configured to identify load-store pairs that cause ordering violations based on the flush and replay signal indications. The flush and replay indications may include the load and the store PCs or other load and store identifiers. LSDP 306 may thus be trained by stores and loads which cause ordering violations, to prevent such events in the future when the same code sequence is refetched and reexecuted in the processor. When an ordering violation is detected for a load which has already received stale data from the data cache, a store queue entry may flush the processor, including the load that caused the violation, back to the fetch unit and LSDP 306 may be trained on this flush event. When an ordering violation is detected for a load which is issued before an older store but the load does not access the stale data at the targeted memory location, then the load may be replayed once the older store has issued, and then the LSDP 306 may be trained on this replay event.

Register mapper 302 may include a memory with an entry for each logical register. The entry for each logical register in the register mapper 302 may store the RNUM of the most recent op to update the logical register. Additional status may be stored in the rename map entries as well. For example, a bit may indicate whether or not the most recent op has been executed. In such an embodiment, register mapper 302 may receive signals from a given reservation station 310 identifying the instructions that have been issued, which may allow register mapper 302 to update the bit. A bit indicating whether or not the most recent op has been retired may also be included.

It is noted that not all of the connections to the units shown in FIG. 3 are illustrated, and the map/dispatch unit 300 may include additional circuitry implementing other operations. For example, register mapper 302 and ROB 304 may receive the flush and replay signal indications to adjust their mappings to account for the instructions being flushed or replayed. Additionally, register mapper 302 and ROB 304 may receive an indication of retiring instructions to adjust their state to the retirement (e.g., freeing entries for assignment to new instructions, updating the architected rename state, etc.). These operations are ancillary to the operation of LSDP 306, and thus are not described in more detail herein.

It is noted that, while PCs and RNUMs are used as identifiers for the stores and PCs are used as identifiers for the loads, other embodiments may use any identifier that may uniquely identify instructions in flight within the processor (e.g., any sort of tag or sequence number).

Figure 4:
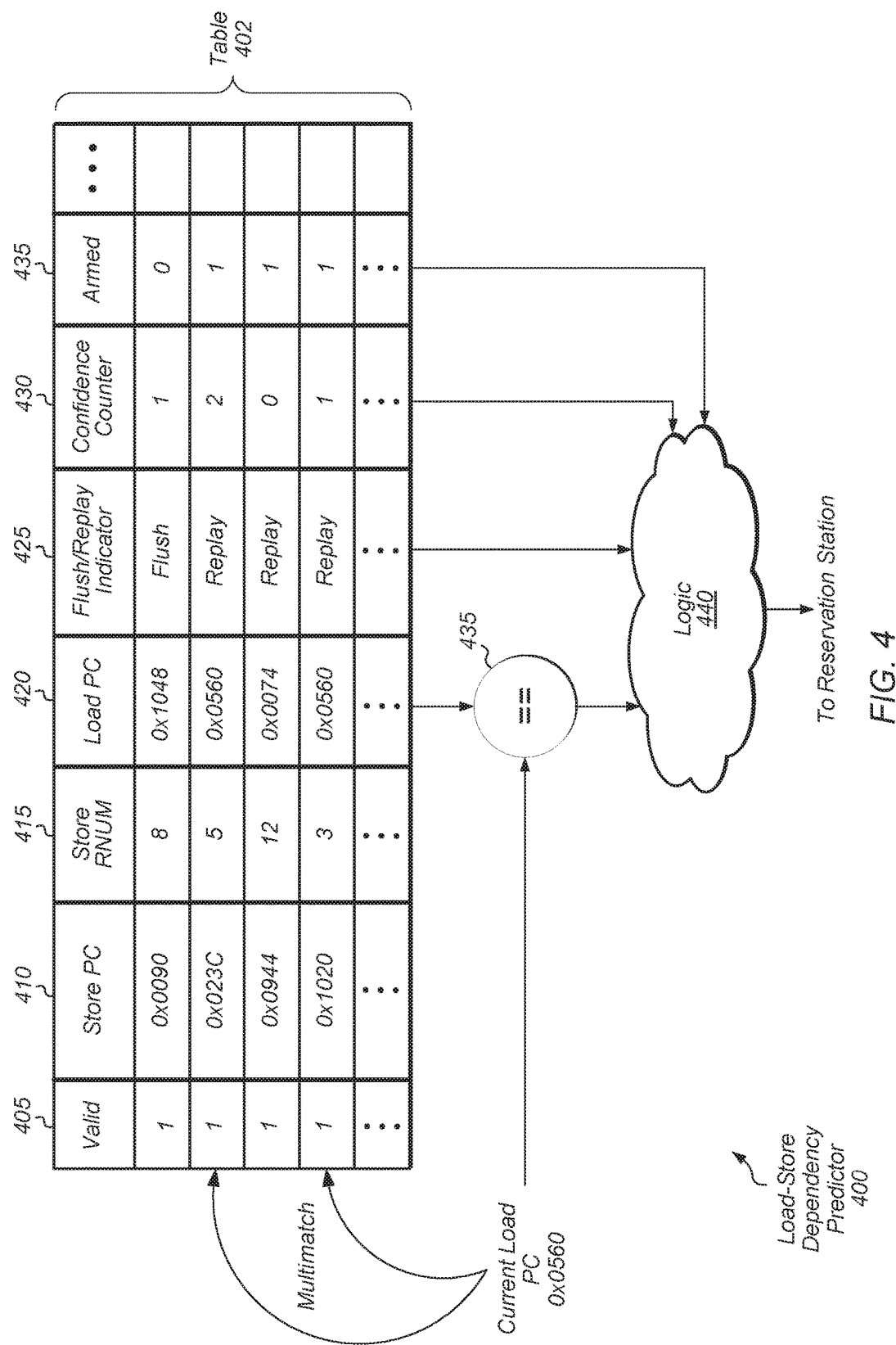
FIG. 4 is a block diagram of one embodiment of a load-store dependency predictor.

Turning now to FIG. 4, a block diagram of a load-store dependency predictor (LSDP) 400 in accordance with one embodiment is shown. LSDP 400 may include table 402, comparator 435, and logic 440. Table 402 may include any number of entries, depending on the embodiment. Each entry may correspond to a load-store pair with overlapping addresses that has been predicted to issue out of order (i.e., the younger load issuing before the older store). In the event that an ordering violation has occurred, table 402 may be trained on this violation, such that an entry for the specific load-store pair is allocated in table 402.

Table 402 may be configured to allow multiple simultaneous accesses and updates by multiple instructions. Furthermore, while table 402 is illustrated as a single, integrated table, in other embodiments, the different fields of table 402 may be separate tables corresponding to separate memories, with entries of the separate tables associated with each other. For example, the load PCs may be a separate table, the store PCs may be a separate table, and a load PC entry may correspond to a store PC entry for which a specific load-store ordering violation has been detected and trained.

Each entry may include a valid indicator 405. Valid indicator 405 may indicate if the entry is a valid entry and if the entry should be used for enforcing a dependency for the corresponding load-store pair. In one embodiment, the valid indicator 405 may be cleared at reset. Valid indicator 405 may also affect the replacement policy, such that invalid entries may be the first entries that are replaced when new entries are allocated. In some embodiments, valid indicator 405 may not be included in the entries of table 402. Instead, in these embodiments, the value of confidence counter field 430 may be used to indicate if the entry is valid.

Each entry may also include a store PC value 410 to identify the specific store instruction of the load-store pair. When a store is dispatched, the store PCs of table 402 may be searched for the PC of the dispatched store. Table 402 may be a content-addressable memory (CAM) for the store PC field, where each entry in the memory includes circuitry to make the comparison. The store PC field may also be a set of registers and comparators that are operated as a CAM. If a dispatched store matches on any entries, then these entries may have the armed bit 435 set. The RNUM of the store may also be written to the store RNUM 415 field of the entry. When a store is issued from a reservation station, then the armed bit 435 may be cleared from any entries of table 402 that were previously armed by that particular store.

When a load is dispatched, the load PC value 420 of each entry of table 402 may be searched for the PC of the dispatched load. Table 402 may be a CAM for the load PC field. If the load matches on an unarmed entry, then a dependency may not be established because the corresponding store has either not been dispatched or has already been issued, and therefore an ordering violation should not occur.

If a dispatched load matches on any armed entries, then logic 440 may determine whether to "establish a dependency" for the specific load-pair based on the values of the flush/replay indicator 425 and the confidence counter 430 for the entries. In this context, to establish a dependency generally means to predict and/or indicate a dependency exists—even though such a dependency may not in fact exist. For example, in one embodiment, the logic 440 may establish a dependency for a first load instruction responsive to determining the confidence value of a corresponding entry is greater than a first threshold if the first load instruction previously caused a flush event. On the other hand, if the first load instruction previously caused a replay event, then the logic 440 may establish a dependency for the first load instruction responsive to determining the confidence value of the corresponding entry is greater than a second threshold, with the second threshold being greater than the first threshold.

In some cases, a load may be dependent on multiple stores. For example, as shown in FIG. 4, the lookup for the load PC value of "0x0560" matches on two separate entries. When a load matches on multiple armed entries, then logic 440 may determine whether to assert the multimatch condition to the reservation station based on the values of the flush/replay indicator 425 and confidence counter 430 for the matching entries. If the multimatch condition is asserted, then the load may wait until all older stores have been issued before the load itself issues. If the load matches on a single armed entry and a dependency is established for the load, then the store RNUM 415 may be written to the reservation station with the load. Also, the dependency bit may be set for the load in the reservation station to indicate that the load has a valid dependency.

Each entry may also include a confidence counter field 430. The value of confidence counter 430 may indicate the strength of the prediction for that particular load-store pair. In one embodiment, confidence counter 430 may be a two-bit up-down counter. In other embodiment, confidence counter 430 may utilize other numbers of bits. Furthermore, confidence counter 430 may be configured to saturate at its maximum and minimum values.

When a store matches on an entry, the confidence counter value 430 may be checked before arming the entry. If the confidence counter value 430 is below a threshold, then the entry may not be armed. If the confidence counter value 430 is above the threshold, then the entry may be armed. In some embodiments, the entry may be armed without checking the confidence counter value 430. When a load matches on an entry, the confidence counter value 430 may also be checked. Only if the confidence counter value 430 is above the threshold may the dependency be enforced. The value of the threshold may vary depending on the embodiment, and may be adjusted according to specific operating conditions. Additionally, there may be different thresholds used for the flush and replay cases. If an entry has a flush indicator, a first threshold may be utilized. If an entry has a replay indicator, then a second threshold may be utilized, with the second threshold greater than the first threshold. Other embodiments may utilize other numbers of thresholds.

Table 402 may also include one or more other fields. Furthermore, table 402 may be formatted differently in other embodiments. Additionally, one or more of the fields shown in table 402 may include a portion of the specified value and/or may be hashed with other values. For example, in some embodiments, the store PC and/or load PC values may be combined with architectural registers and/or hashed. Also, the store PC and load PC values may only include a portion of the actual PC values in some embodiments. Additionally, it should be understood that LSDP 400 is merely one example of a LSDP which may be implemented. In other embodiments, other components and/or logic may be included and/or LSDP 400 may be structured in other suitable manners.

Figure 5:
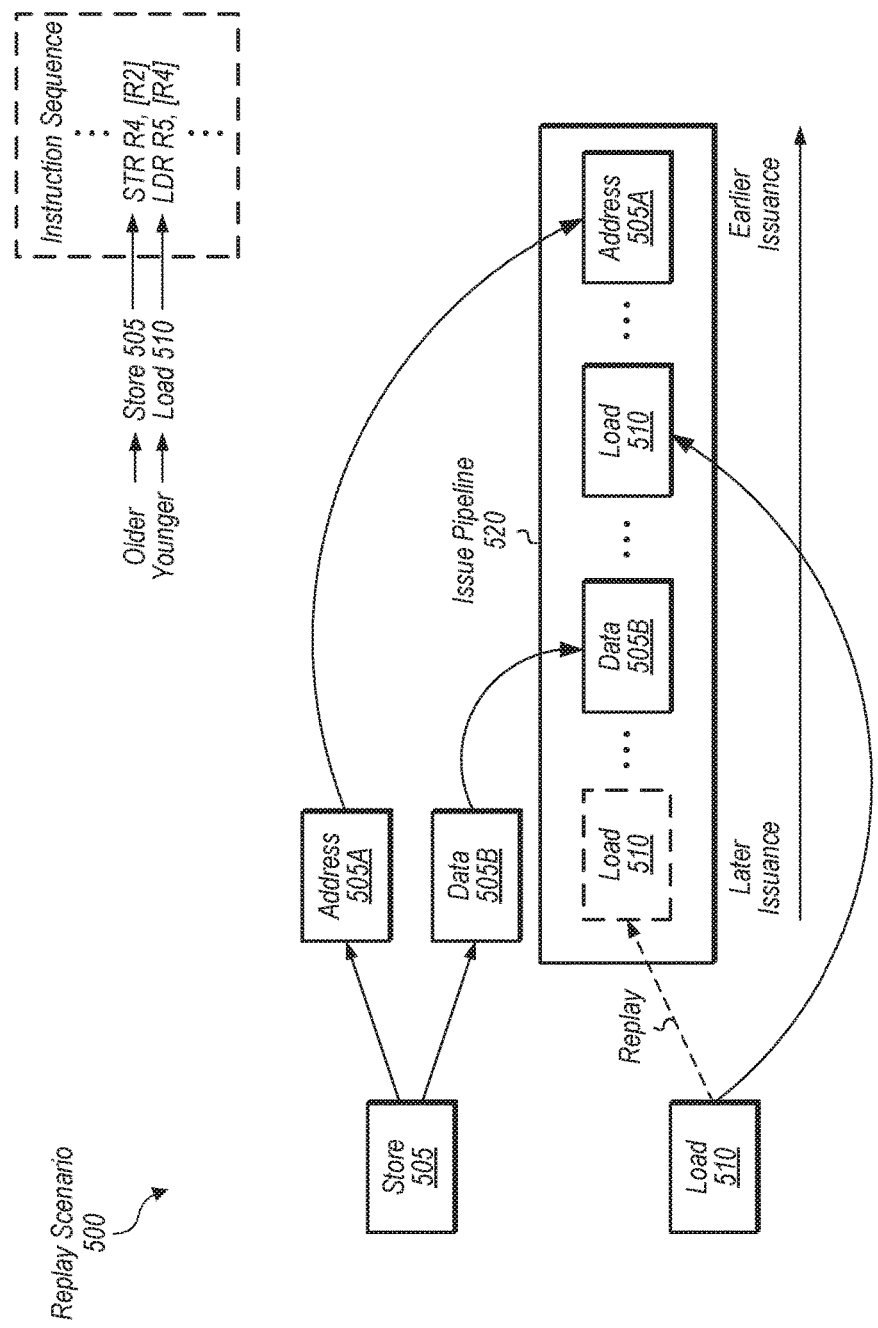
FIG. 5 is a block diagram of one embodiment of a replay scenario for a dependent load-store pair.

Referring now to FIG. 5, a block diagram of a replay scenario 500 for a dependent load-store pair is shown. Replay scenario 500 illustrates a scenario that may result in a replay event in one embodiment. It may be assumed for the purposes of this discussion that load 510 is younger than and dependent on store 505. In other words, store 505 is earlier in the instruction sequence than load 510, and store 505 and load 510 have overlapping addresses. The blocks showing store 505 and load 510 are intended to represent a store instruction and a load instruction, respectively. An example of an instruction sequence in accordance with one embodiment is shown on the top right of FIG. 5, with store 505 represented by the instruction "STR R4, [R2]" and load 510 represented by the instruction "LDR R5, [R4]". In other embodiments, other types of store and load instructions may be utilized.

In one embodiment, store 505 may be split up into an address operation (represented by address 505A) and a data operation (represented by data 505B). Typically, the address source will be ready before the data source of a store instruction, and so address 505A may be issued before data 505B. As shown in issue pipeline 520, store address 505A is issued before load 510. Issue pipeline 520 shows the order in which instructions are issued to reservation stations in a processor pipeline (e.g., processor 200 of FIG. 2), with blocks on the right side of issue pipeline 520 representing instructions which issued earlier than blocks on the left side of issue pipeline 520.

When load 510 issues after store address 505A but before store data 505B, load 510 will not be able to access the correct data to provide to its dependent instructions. The load-store unit may detect the store address in the store queue (e.g., store queue 295 of FIG. 2) when load 510 issues, and so the load-store unit will determine that there is an older store to the same address. In this case, load 510 will not take in cache data and forward this data to its dependents. Rather, the processor will wait for store data 505B to issue, and then load 510 will be issued again (i.e., replayed) after store data 505B issues. The LSDP (e.g., LSDP 400 of FIG. 4) may be trained on the replay scenario 500 to prevent this replay scenario 500 from occurring again.

Figure 6:
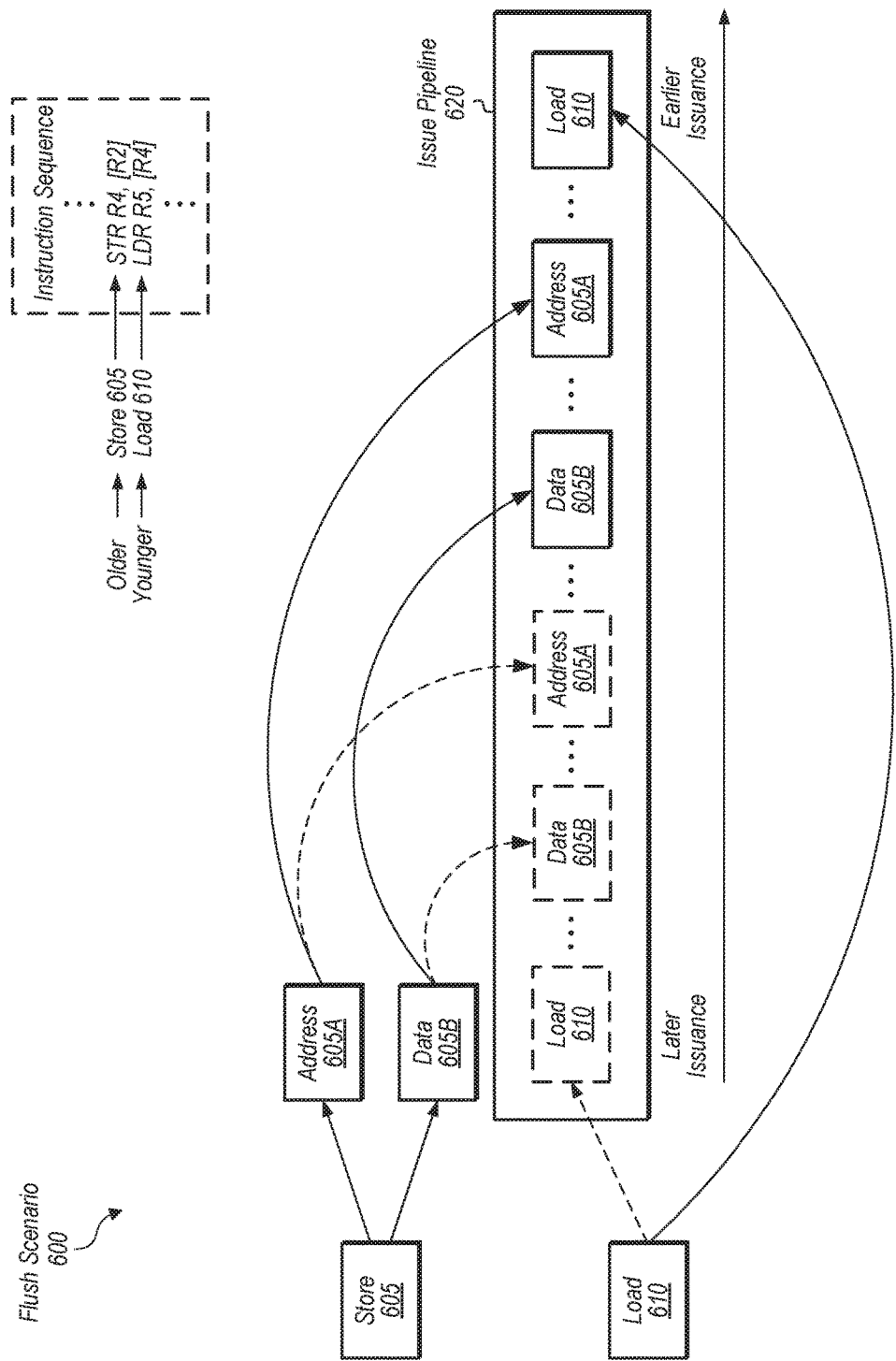
FIG. 6 is a block diagram of one embodiment of a flush scenario for a dependent load-store pair.

Turning now to FIG. 6, a block diagram of one embodiment of a flush scenario 600 for a dependent load-store pair is shown. Store instruction 605 may be older than load instruction 610, and load instruction 610 may be dependent on store instruction 605. An example of an instruction sequence that includes store 605 and load 610 is shown on the top right of FIG. 6, with store 605 represented by the instruction "STR R4, [R2]" and load 610 represented by the instruction "LDR R5, [R4]".

In one embodiment, store 605 may be split into an address portion 605A and data portion 605B. In other embodiments, store 605 may be issued as a single instruction rather than being split into address and data portions. As shown in issue pipeline 620, load 610 is initially issued before address 605A and data 605B. Any number of instructions (from 0-N, where 'N' is a positive integer) may be issued in between load 610 and address 605A, and any number of instructions may be issued in between address 605A and data 605B. Since load 610 is issued before address 605A, load 610 may retrieve stale data from the data cache and forward the data to dependent instructions. Accordingly, when address 605A and data 605B are issued, the processor will determine that load 610 already picked up erroneous data from the data cache, and the processor will flush issue pipeline 620 of load 610 and all subsequent instructions, which includes address 605A and data 605B. The LSDP (e.g., LSDP 400 of FIG. 4) may be trained on this flush event to create an entry for load 610 and store 605 to prevent load 610 from issuing before store 605 during future executions.

Then, after issue pipeline 620 has been flushed, the processor will again start issuing instructions. This time, the processor may reissue address 605A and data 605B before load 610 to prevent a repeat of the previous ordering violation. It is noted that flush scenario 600 also involves a replay of instructions similar to the replay scenario 500 of FIG. 5. However, flush scenario 600 has a greater negative impact on instruction execution since flush scenario 600 involves the flushing and replaying of potentially a large number of instructions. Replay scenario 500 included the replay of a single instruction (load 510) and is not as costly in terms of wasted clock cycles as flush scenario 600. Accordingly, a processor may implement a stricter mechanism for preventing a flush scenario as compared to a replay scenario.

It should be understood that the flush scenario 600 illustrated in FIG. 6 is merely one example of a flush scenario that may be encountered in a processor pipeline. Other flush scenarios with other types, numbers, and sequences of instructions may also be encountered in a processor pipeline.

Figure 7:
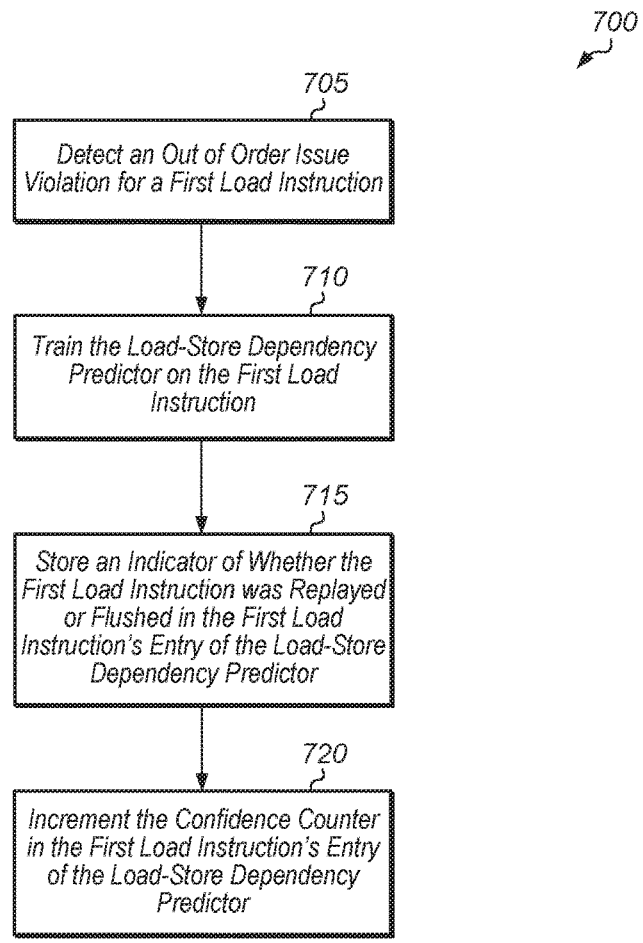
FIG. 7 is a generalized flow diagram illustrating one embodiment of a method for implementing a load-store dependency predictor.

Referring now to FIG. 7, one embodiment of a method 700 for implementing a load-store dependency predictor is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 700.

An out of order issue violation for a first load instruction may be detected in a processor (block 705). In various embodiments, the processor may be included within a host device, wherein the host device is a smartphone, tablet, laptop computer, desktop computer, watch, server, programmable consumer electronic device, set-top box, television, satellite receiver, or other electronic device or computing system. The out of order issue violation may be detected when the first load instruction issues before an older store instruction upon which the first load instruction is dependent. The out of order issue violation may result in a replay or a flush of the first load instruction.

In response to detecting the out of order issue violation of the first load instruction, the load-store dependency predictor may be trained on the first load instruction (block 710). In some cases, training the load-store dependency predictor may include allocating a new entry in the load-store dependency predictor for the first load instruction. If the first load instruction already has an existing entry in the load-store dependency predictor, then training the load-store dependency predictor may include updating the information of the existing entry. An indicator of whether the first load instruction was replayed or flushed may be stored in the first load's entry of the load-store dependency predictor (block 715). Also, the confidence counter in the first load instruction's entry may be incremented (block 720). After block 720, method 700 may end.

Figure 8:
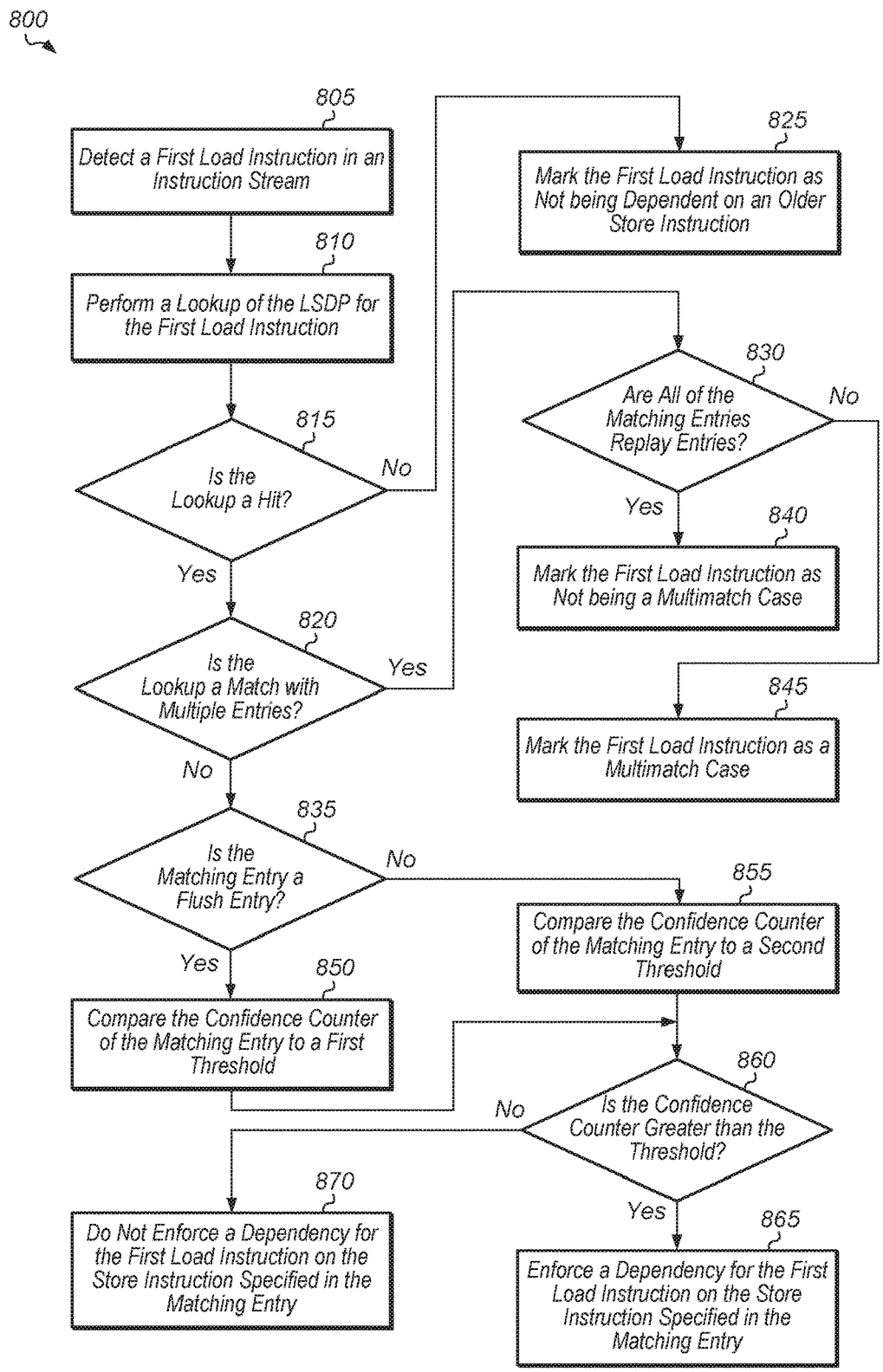
FIG. 8 is a generalized flow diagram illustrating another embodiment of a method for implementing a load-store dependency predictor.

Turning now to FIG. 8, one embodiment of another method 800 for implementing a load-store dependency predictor is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 800.

A first load instruction may be detected in an instruction stream (block 805). Next, a lookup of the load-store dependency predictor (LSDP) may be performed for the first load instruction (block 810). If the lookup to the LSDP is a hit (conditional block 815, "yes" leg), then the LSDP may determine if the first load instruction matched with multiple entries of the LSDP (conditional block 820). If the lookup to the LSDP is a miss (conditional block 815, "no" leg), then the first load instruction may be marked as not being dependent on an older store instruction (block 825). When the first load instruction is marked as not being dependent on an older store instruction, the first load instruction may be issued when ready rather than waiting on an older store instruction to issue.

If the first load instruction matches with multiple entries of the LSDP (conditional block 820, "yes" leg), then it may be determined if all of the matching entries are replay entries (conditional block 830). If the first load instruction does not match multiple entries of the LSDP (conditional block 820, "no" leg), then it may be determined if the matching entry is a flush entry (conditional block 835). If all of the matching entries are marked as replay entries (conditional block 830, "yes" leg), then the first load instruction may be marked as not being a multimatch case (block 840). In one embodiment, if the first load instruction is marked as not being a multimatch case, then the first load instruction may be issued when ready and not wait for any older store instructions. In another embodiment, if the first load instruction is marked as not being a multimatch case, then the first load instruction may be marked as being dependent on a single store instruction. A single matching entry may be randomly selected from the multiple matching entries, and the first load instruction may be marked as being dependent on the store from the selected matching entry. In other embodiments, other techniques for selecting a single matching entry may be utilized. If one or more of the matching entries are marked as flush entries (conditional block 830, "no" leg), then the first load instruction may be marked as a multimatch case (block 845). When the first load is marked as a multimatch case, the first load instruction may wait to issue until all older stores have issued.

If the matching entry is a flush entry (conditional block 835, "yes" leg), then the confidence counter of the matching entry may be compared to a first threshold (block 850). If the matching entry is a replay entry (conditional block 835, "no" leg), then the confidence counter of the matching entry may be compared to a second threshold (block 855). It may be assumed for the purposes of this discussion that the second threshold is greater than the first threshold.

If the confidence counter of the matching entry is greater than the threshold (conditional block 860, "yes" leg), then the dependency may be enforced for the first load instruction on the store instruction specified in the matching entry (block 865). It is noted that in some embodiments, conditional block 860 may check if the confidence counter is greater than or equal to the selected threshold. Enforcing the dependency involves waiting to issue the first load instruction until after the store instruction specified by the matching entry has issued. If the confidence counter of the matching entry is less than the threshold (conditional block 860, "no" leg), then a dependency may not be enforced for the first load instruction on the store instruction specified in the matching entry (block 870). Not enforcing the dependency means that the first load instruction may be issued before the store specified by the matching entry has been issued. It is noted that the first load instruction does not have to issue before the specified store in block 870, but that the first load instruction is not required to wait to issue until after the specified store has issued. After blocks 825, 840, 845, 865, and 870, method 800 may end.

Figure 9:
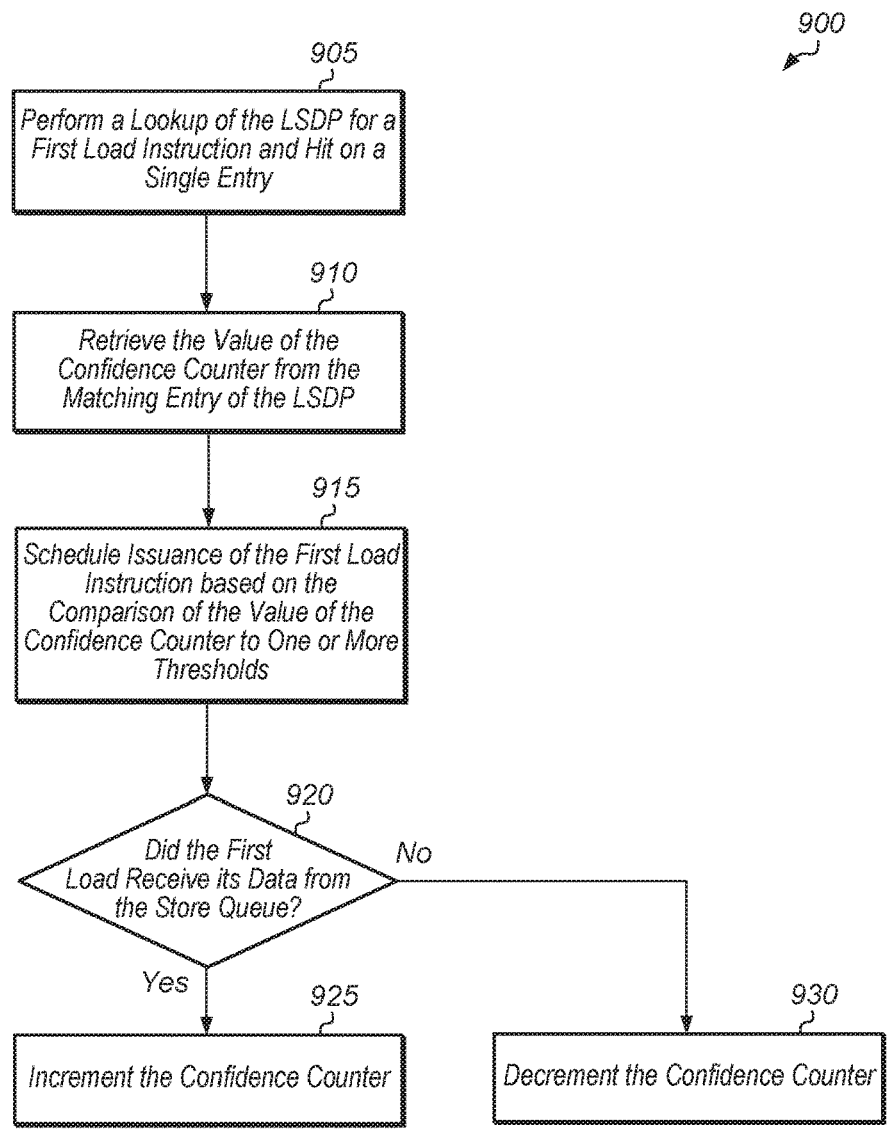
FIG. 9 is a generalized flow diagram illustrating one embodiment of a method for training the load-store dependency predictor.

Referring now to FIG. 9, one embodiment of a method 900 for training the load-store dependency predictor is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 900.

A lookup of the load-store dependency predictor (LSDP) may be performed for a first load instruction and the first load may hit on a single entry of the load-store dependency predictor (block 905). Next, the value of the confidence counter may be retrieved from the matching entry of the LSDP (block 910).

Then, the issuance of the first load may be scheduled based on the comparison of the confidence counter to one or more thresholds (block 915). The scheduling of the first load may also be based on whether the entry of the LSDP is marked as a flush entry or a replay entry. After the first load is issued, it may be determined if the first load received its data from the store queue (conditional block 920). In another embodiment, the processor may determine if the first load received its data from one or more older in-flight stores in conditional block 920.

If the first load receives its data from the store queue (conditional block 920, "yes" leg), then the confidence counter may be incremented (block 925). If the confidence counter is already at its maximum value, then the confidence counter may remain unchanged in block 925. If the first load does not receive its data from the store queue (conditional block 920, "no" leg), then the confidence counter may be decremented (block 930). If the confidence counter is already at its minimum value, then the confidence counter may remain unchanged in block 930. After blocks 925 and 930, method 900 may end.

Figure 10:
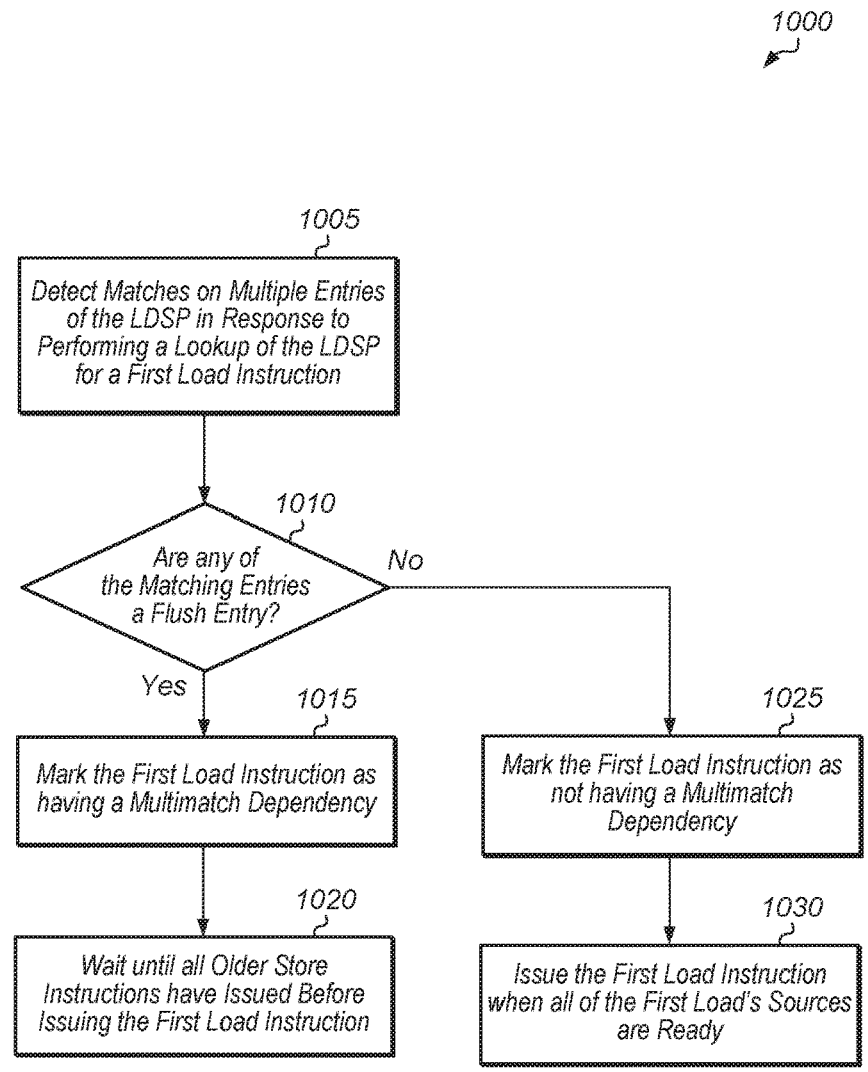
FIG. 10 is a generalized flow diagram illustrating one embodiment of a method for processing a multi-match case.

Turning now to FIG. 10, one embodiment of a method 1000 for processing a multimatch case is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 1000.

Matches on multiple entries of a load-store dependency predictor (LSDP) may be detected in response to performing a lookup of the LSDP for a first load instruction (block 1005). In response to the lookup matching on multiple entries, the LSDP may determine if any of the matching entries is a flush entry (conditional block 1010). If any of the matching entries is a flush entry (conditional block 1010, "yes" leg), then the first load may be marked as having a multimatch dependency (block 1015). When the first load is marked as having a multimatch dependency, the first load may wait to issue until all older stores have issued (block 1020). If all of the matching entries are replay entries (conditional block 1010, "no" leg), then the first load may be marked as not having a multimatch dependency (block 1025). When the first load is marked as not having a multimatch dependency, the first load may issue when all of the first load's sources are ready (block 1030). After blocks 1020 and 1030, method 1000 may end.

Figure 11:
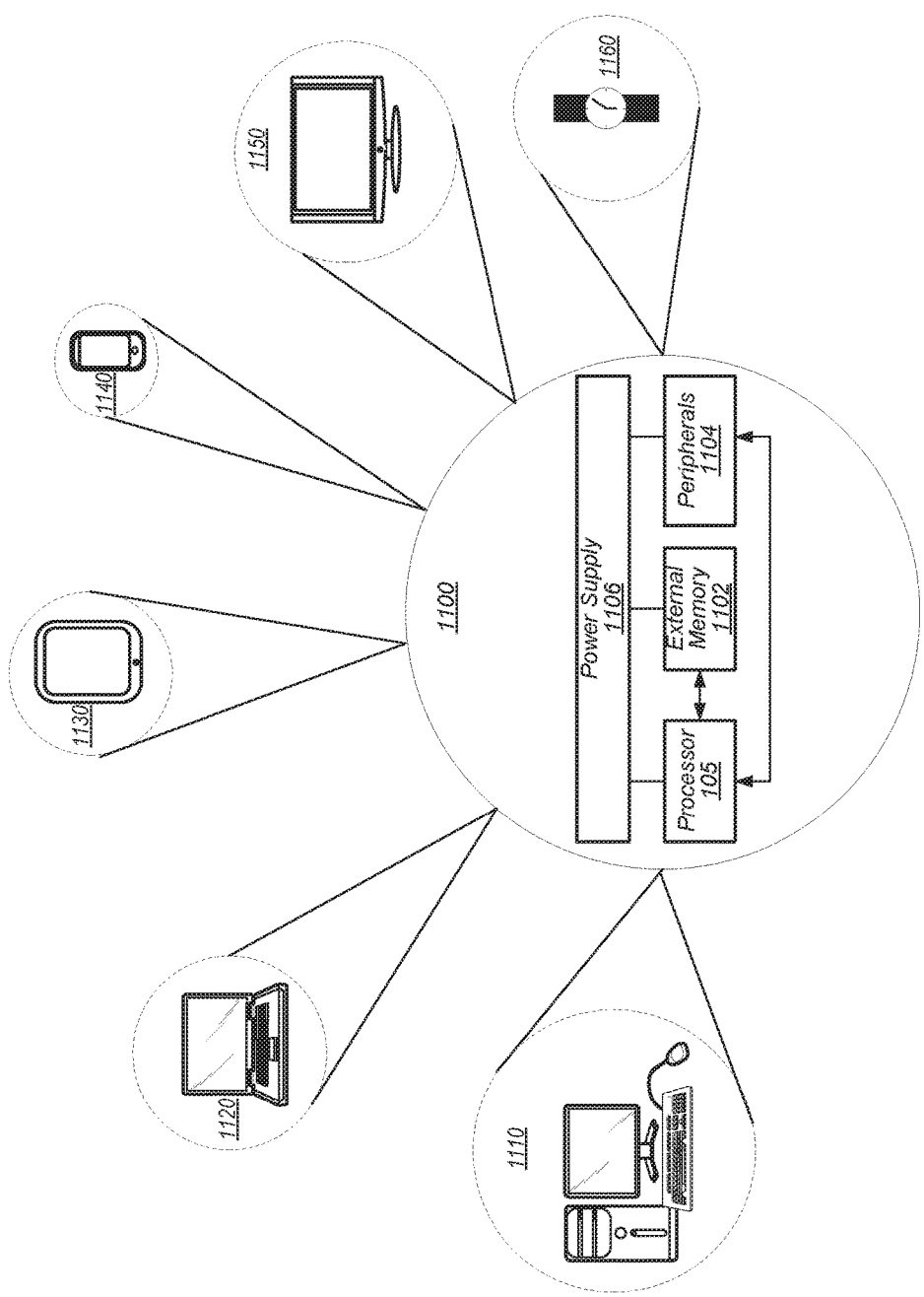
FIG. 11 is a block diagram of one embodiment of a system.

Turning next to FIG. 11, a block diagram of one embodiment of a system 1100 is shown. As shown, system 1100 may represent chip, circuitry, components, etc., of a desktop computer 1110, laptop computer 1120, tablet computer 1130, cell or mobile phone 1140, television 1150 (or set top box configured to be coupled to a television), wrist watch or other wearable item 1160, or otherwise. Other devices are possible and are contemplated. In the illustrated embodiment, the system 1100 includes at least one instance of CPU 105 (of FIG. 1) coupled to an external memory 1102. In various embodiments, CPU 105 may be included within a system on chip (SoC) or integrated circuit (IC) which is coupled to external memory 1102, peripherals 1104, and power supply 1106.

CPU 105 is coupled to one or more peripherals 1104 and the external memory 1102. A power supply 1106 is also provided which supplies the supply voltages to CPU 105 as well as one or more supply voltages to the memory 1102 and/or the peripherals 1104. In various embodiments, power supply 1106 may represent a battery (e.g., a rechargeable battery in a smart phone, laptop or tablet computer). In some embodiments, more than one instance of CPU 105 may be included (and more than one external memory 1102 may be included as well).

The memory 1102 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing CPU 105 in a chip-on-chip configuration, a package-on-package configuration, or a multi-chip module configuration.

The peripherals 1104 may include any desired circuitry, depending on the type of system 1100. For example, in one embodiment, peripherals 1104 may include devices for various types of wireless communication, such as wifi, Bluetooth, cellular, global positioning system, etc. The peripherals 1104 may also include additional storage, including RAM storage, solid state storage, or disk storage. The peripherals 1104 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a load-store dependency predictor comprising a table having a plurality of entries; and
   circuitry configured to:
      detect a first load instruction;
      determine that the first load instruction matches a first entry in the table, wherein the first entry includes an indication as to whether a previous ordering violation resulted in a flush event or a replay event; and
      responsive to determining the first load instruction caused a flush event during a previous execution of the first load instruction, establish a dependency of the first load instruction on a store instruction responsive to determining a confidence value stored in the first entry is greater than a first threshold; and
      responsive to determining the first load instruction caused a replay event during the previous execution of the first load instruction, establish a dependency of the first load instruction on the store instruction responsive to determining the confidence value stored in the first entry is greater than a second threshold different from the first threshold.

2. The processor as recited in claim 1, wherein the processor is configured to:
   store an indication of a flush event in the first entry of the table responsive to detecting a flush event during execution of the first load instruction; and
   store an indication of a replay event in the first entry responsive to detecting a replay event during execution of the first load instruction.

3. The processor as recited in claim 1, wherein the second threshold is greater than the first threshold.

4. The processor as recited in claim 1, further comprising a reservation station, wherein responsive to determining the first load instruction matches multiple entries of the table and responsive to determining all matching entries have replay indicators, the processor is configured to mark the first load instruction as not being a multimatch case in a corresponding reservation station entry.

5. The processor as recited in claim 4, wherein if the first load instruction is marked as not being a multimatch case, the reservation station is configured to issue the first load instruction prior to one or more older store instructions.

6. The processor as recited in claim 1, wherein the processor is configured to split the store instruction into a store address operation and a store data operation, wherein the first load instruction is dependent on the store instruction, wherein a replay event rather than a flush event occurs when the first load instruction issues after the store address operation but before the store data operation, and wherein a flush event rather than a replay event occurs when the first load instruction issues before both the store address operation and the store data operation.

7. The processor as recited in claim 1, further comprising a store queue, wherein the processor is configured to:
   increment the confidence value responsive to determining the first load instruction received data from the store queue; and
   decrement the confidence counter value responsive to determining the first load instruction did not receive data from the store queue.

8. A method comprising:
   detecting a first load instruction;
   determining that the first load instruction matches a first entry in a table of a load-store dependency predictor, wherein the first entry includes an indication as to whether a previous ordering violation resulted in a flush event or a replay event; and
   responsive to determining the first load instruction caused a flush event during a previous execution of the first load instruction, establishing a dependency of the first load instruction on a store instruction responsive to determining a confidence value stored in the first entry is greater than a first threshold; and
   responsive to determining the first load instruction caused a replay event during the previous execution of the first load instruction, establishing a dependency of the first load instruction on the store instruction responsive to determining the confidence value stored in the first entry is greater than a second threshold different from the first threshold.

9. The method as recited in claim 8, further comprising:
storing an indication of a flush event in the first entry of the table responsive to detecting a flush event during execution of the first load instruction; and
storing an indication of a replay event in the first entry responsive to detecting a replay event during execution of the first load instruction.

10. The method as recited in claim 8, wherein the second threshold is greater than the first threshold.

11. The method as recited in claim 8, further comprising marking the first load instruction as not being a multimatch case in a corresponding reservation station entry responsive to determining the first load instruction matches on multiple entries of the table and responsive to determining all matching entries have replay indicators.

12. The method as recited in claim 11, further comprising issuing the first load instruction prior to one or more older store instructions responsive to determining the first load instruction is marked as not being a multimatch case.

13. The method as recited in claim 8, further comprising splitting the store instruction into a store address operation and a store data operation, wherein a first load instruction is dependent on the store instruction, wherein a replay rather than a flush occurs when the first load instruction issues after the store address operation but before the store data operation, and wherein a flush rather than a replay occurs when the first load instruction issues before both the store address operation and the store data operation.

14. The method as recited in claim 8, further comprising:
incrementing the confidence value responsive to determining the given load instruction received data from a store queue; and
decrementing the confidence value responsive to determining the given load instruction did not receive data from the store queue.

15. A computing system comprising:
a memory; and
a processor comprising a load-store dependency predictor, wherein the processor is configured to:
detect a first load instruction;
determine that the first load instruction matches a first entry in a table in the load-store dependency predictor, wherein the first entry includes an indication as to whether a previous ordering violation resulted in a flush event or a replay event; and
responsive to determining the first load instruction caused a flush event during a previous execution of the first load instruction, establish a dependency of the first load instruction on a store instruction responsive to determining a confidence value stored in the first entry is greater than a first threshold; and
responsive to determining the first load instruction caused a replay event during the previous execution of the first load instruction, establish a dependency of the first load instruction on the store instruction responsive to determining the confidence value stored in the first entry is greater than a second threshold different from the first threshold.

16. The computing system as recited in claim 15, wherein the processor is configured to:
store an indication of a flush event in the first entry of the table responsive to detecting a flush event during execution of the first load instruction; and
store an indication of a replay event in the first entry responsive to detecting a replay event during execution of the first load instruction.

17. The computing system as recited in claim 15, wherein the second threshold is greater than the first threshold.

18. The computing system as recited in claim 15, wherein the processor further comprises a reservation station, wherein responsive to determining the first load instruction matches on multiple entries of the table and responsive to determining all matching entries have replay indicators, the processor is configured to mark the first load instruction as not being a multimatch case in a corresponding reservation station entry.

19. The computing system as recited in claim 18, wherein if the first load instruction is marked as not being a multimatch case, the reservation station is configured to issue the first load instruction prior to one or more older store instructions.

20. The computing system as recited in claim 15, wherein the processor is configured to split the store instruction into a store address operation and a store data operation, wherein a first load instruction is dependent on the store instruction, wherein a replay event rather than a flush event occurs when the first load instruction issues after the store address operation but before the store data operation, and wherein a flush event rather than a replay event occurs when the first load instruction issues before both the store address operation and the store data operation.

* * * * *